(12) United States Patent
Knight

(10) Patent No.: US 7,000,377 B1
(45) Date of Patent: Feb. 21, 2006

(54) SUPER-STAGED AND CONTINUOUSLY STAGED ROCKET

(76) Inventor: Andrew F. Knight, 2521 Glengyle Dr., Vienna, VA (US) 22181

( * ) Notice: Subject to any disclaimer, the term of this patent is extended or adjusted under 35 U.S.C. 154(b) by 0 days.

(21) Appl. No.: 10/831,305

(22) Filed: Apr. 26, 2004

(51) Int. Cl.
*F02K 9/76* (2006.01)

(52) U.S. Cl. .............................. 60/225; 60/253; 60/251

(58) Field of Classification Search .................. 60/224, 60/225, 221, 222, 251, 253, 254
See application file for complete search history.

(56) References Cited

U.S. PATENT DOCUMENTS

| | | | | |
|---|---|---|---|---|
| 2,745,347 A | * | 5/1956 | Lightbody et al. | 102/377 |
| 3,093,964 A | * | 6/1963 | Hausmann | 60/225 |
| 4,723,736 A | * | 2/1988 | Rider | 244/172 |
| 4,964,340 A | * | 10/1990 | Daniels et al. | 102/377 |
| 5,343,698 A | * | 9/1994 | Porter et al. | 60/770 |
| 5,509,354 A | * | 4/1996 | Dorffler et al. | 102/202 |
| 6,439,503 B1 | * | 8/2002 | Winfree et al. | 244/53 R |

\* cited by examiner

*Primary Examiner*—William H. Rodriguez

(57) ABSTRACT

A super-staged rocket includes at least approximately 50 rocket engines, where the engines are distributed according to at least one of: at least five multi-engine stages connected in series, each stage including at least ten engines connected in parallel; and at least five multi-stage units connected in parallel, each unit including at least five engines connected in series.

12 Claims, 14 Drawing Sheets

SUPER-STAGED AND CONTINUOUSLY STAGED ROCKET

BACKGROUND

Rockets are complicated and expensive objects, in part because they must be very reliable to ensure safety to passengers (for manned vehicles) and to prevent damage to multi-million-dollar payloads, and in part because they must have relatively high performance (e.g., high specific impulse and/or high thrust-to-weight) to allow the rocket mission to be performed within one to three stages, as additional stages typically reduce reliability. Therefore, even the simplest rocket engine design, a solid propellant engine, may be prohibitively expensive.

SUMMARY OF THE INVENTION

The present invention aims to solve one or more of these and other problems.

According to a preferred embodiment of the present invention, a solid propellant rocket engine comprises: a propellant formed into a predetermined shape and capable of deflagrating into hot, high-pressure gas upon ignition; and a nozzle configured and positioned to expand the hot, high-pressure gas into the atmosphere, wherein the predetermined shape comprises a combustion cavity, and wherein the propellant forms the nozzle as a part of the predetermined shape. The nozzle may consist essentially of the propellant, and the propellant may comprise potassium nitrate and sucrose.

In one aspect, the engine may further comprise a fast-burning igniter located in the combustion cavity, wherein the igniter has at least one of a substantially higher burn rate and a substantially lower density than the propellant. The igniter may be fibrous, such as nitrated cotton. The igniter may be enclosed by a substantially impermeable wrapping.

In one aspect, the engine may further comprise a heat retardant layer connected to and surrounding an external surface of the propellant and configured to prevent or retard a spreading of a flame to the external surface, wherein the heat retardant layer is not configured to withstand a combustion pressure in the combustion cavity. In one aspect, the engine may further comprise a pressure containing layer connected to and surrounding an external surface of the propellant and configured to withstand a combustion pressure in the combustion cavity.

In one aspect, the engine is enclosed by a substantially impermeable wrapping. In one aspect, the nozzle has a throat diameter substantially smaller than a maximum diameter of the combustion cavity.

In one aspect, the predetermined shape comprises an indentation configured so that, at an end of a burn of the rocket engine, the rocket engine preferentially bursts and ejects the hot, high pressure gas at a location of the indentation. The rocket engine may be shaped so as to be connectable to a substantially identical rocket engine, whereby the indentation is located on the predetermined shape so that ejection of the hot, high pressure gas from the location of the indentation causes ignition of the substantially identical rocket engine.

According to another preferred embodiment, a method for manufacturing a solid propellant rocket engine as described may comprise: providing the igniter, the igniter having a predetermined exterior shape; providing the propellant in a substantially fluid form by nature of being molten or mixed with at least one of a fluid binder and a volatile solvent; displacing the propellant by the igniter; and causing the propellant to solidify into the predetermined shape, wherein a shape of the combustion cavity corresponds to the predetermined exterior shape of the igniter.

According to another preferred embodiment, a continuously staged rocket engine comprises: a solid propellant rocket engine as described, wherein the combustion cavity has a length, wherein, during at least a majority of a burn of said engine: a burning length of the propellant burning in said combustion cavity is substantially shorter than said length; and a burning position of the propellant burning in said combustion cavity moves along said length.

In one aspect, the engine may further comprise a structure-providing layer, which may comprise the propellant, configured to provide structural support to said rocket, wherein said structure-providing layer is shed from said engine at approximately the same rate as a movement of said burning position.

In one aspect, the engine may further comprise a combustion inhibitor lining at least a portion of an interior surface of the combustion cavity, wherein at least one of vaporization, combustion, and melting of said combustion inhibitor causes said burning position to move along said length. In one aspect, the engine may further comprise a mechanical combustion regulator movable inside said combustion chamber, configured to be moved at a rate of said movement of said burning position. In one aspect, the engine may further comprise a high pressure gas source configured to slow a movement of said burning position by providing a high pressure gas to said combustion chamber.

According to another preferred embodiment, a multi-stage rocket unit comprises a plurality, such as at least five, of solid propellant rocket engines as described, wherein the rocket engines are directly connected in series and at least one of: integrally connected to each other; and adhesively bonded to each other.

In one aspect, the multi-stage rocket unit may further comprise a fast-burning igniter located in a combustion cavity of at least most of the rocket engines, wherein the igniter has at least one of a substantially higher burn rate and a substantially lower density than the propellant.

In one aspect, the multi-stage rocket unit may further comprise a heat retardant layer connected to and surrounding an external surface of the unit and configured to prevent or retard a spreading of a flame to the external surface, wherein the heat retardant layer is not configured to withstand a combustion pressure in a combustion cavity of at least one of the rocket engines. In one aspect, the multi-stage rocket unit may further comprise a pressure containing layer connected to and surrounding an external surface of the unit and configured to withstand at least a substantial portion of a combustion pressure in a combustion cavity of at least one of the rocket engines.

In one aspect, a predetermined shape of at least one of the rocket engines comprises an indentation configured so that, at an end of a burn of the at least one rocket engine, the at least one rocket engine preferentially bursts and ejects the hot, high pressure gas at a location of the indentation so as to ignite an adjacent upper rocket engine. A nozzle of at least one of the rocket engines may have a throat diameter substantially smaller than a maximum diameter of a combustion cavity of the at least one of the rocket engines.

According to another preferred embodiment, a method of manufacturing a multi-stage rocket unit comprises: providing a plurality of pre-fabricated rocket engines as described; placing the rocket engines in a column in an end-to-end configuration; providing at least one of molten propellant, a volatile solvent, and an adhesive on at least one end in each end-end pair; and connecting the rocket engines to form a continuous column.

In one aspect, the method further comprises applying a heat retardant layer to an external surface of the unit that is configured to prevent or retard a spreading of a flame to the external surface, wherein the heat retardant layer is not configured to withstand a combustion pressure in a combustion cavity of at least one of the rocket engines. In one aspect, the method further comprises applying a pressure containing layer connected to and surrounding an external surface of the unit and configured to withstand at least a substantial portion of a combustion pressure in a combustion cavity of at least one of the rocket engines.

According to another preferred embodiment, a method of manufacturing a multi-stage rocket unit comprises substantially continuously fabricating a plurality of rocket engines as described, wherein the method comprises: a) providing an exterior surface mold; b) providing the propellant in a substantially fluid form by nature of being molten or mixed with at least one of a fluid binder and a volatile solvent; c) providing an igniter inside the mold, the igniter having a predetermined exterior shape; d) pouring the propellant in the mold so that the propellant is displaced by the igniter; e) causing the propellant to solidify into the predetermined shape, wherein a shape of the combustion cavity corresponds to the predetermined exterior shape of the igniter; and f) repeating steps d)–e) in a continuous process and repeating step c) at least four times. The unit may comprise the mold, whereby mold is configured to not be removed from the unit.

According to another preferred embodiment, a multi-stage rocket unit comprises: a plurality, such as at least five, of solid propellant rocket engines as described; and a structure providing layer connected to and surrounding an external surface of the unit, wherein the rocket engines are connected to each other in series at least by the structure providing layer, and wherein the structure providing layer structurally supports the engines relative to each other.

In one aspect, substantially all of the plurality of rocket engines are directly, adhesively connected to the structure providing layer. In one aspect, substantially all of the plurality of rocket engines are directly, frictionally connected to the structure providing layer.

In one aspect, the multi-stage rocket unit further comprises a top stop located at a top of the unit and a bottom stop located at a bottom of the unit, wherein the rocket engines are movable relative to the structure providing layer and are held in place in the structure providing layer via at least one of the top and bottom stops.

In one aspect, the multi-stage rocket unit further comprises a fast-burning igniter located in a combustion cavity of at least most of the rocket engines, wherein the igniter has at least one of a substantially higher burn rate and a substantially lower density than the propellant. In one aspect, a predetermined shape of at least one of the rocket engines comprises an indentation configured so that, at an end of a burn of the at least one rocket engine, the at least one rocket engine preferentially bursts and ejects the hot, high pressure gas at a location of the indentation so as to ignite an adjacent upper rocket engine. In one aspect, a nozzle of at least one of the rocket engines has a throat diameter substantially smaller than a maximum diameter of a combustion cavity of the at least one of the rocket engines.

In one aspect, the structure providing layer comprises paper. In one aspect, the structure providing layer comprises a heat retardant layer that is configured to prevent or retard a spreading of a flame to the external surface. In one aspect, the structure providing layer comprises a pressure containing layer that is configured to withstand at least a substantial portion of a combustion pressure in a combustion cavity of at least one of the rocket engines.

According to another preferred embodiment, a method of manufacturing a multi-stage rocket unit comprises: providing a plurality of rocket engines as described; placing the rocket engines in a column in an end-to-end configuration; providing a heat retardant sheet; tightly wrapping the placed plurality of rocket engines in the sheet; and after wrapping, attaching the sheet to itself so as to prevent the sheet from unwrapping.

In one aspect, the method further comprises adhesively bonding the rocket engines to the sheet. In one aspect, the sheet is of sufficient thickness and, during the wrapping, the sheet is wrapped over itself sufficiently many times, that the sheet forms a pressure containing layer configured to withstand at least a substantial portion of a combustion pressure in a combustion cavity of at least one of the rocket engines.

In one aspect, the placing comprises placing the rocket engines in direct contact in the column, whereby the rocket engines are flush with each other. In one aspect, the placing comprises spacing the rocket engines apart, whereby facing ends of the rocket engines are separated.

According to another preferred embodiment, a super-staged solid propellant rocket comprises a plurality of multi-stage rocket units as described, the multi-engine solid rocket stages located in parallel so that more than one multi-stage rocket unit may burn and provide thrust simultaneously. In one aspect, the plurality of rocket engines in each unit comprises at least five rocket engines, and wherein the plurality of multi-stage solid rocket units comprises at least five units, whereby the super-staged rocket comprises at least 25 individual solid propellant rocket engines.

In one aspect, at least one of the multi-stage rocket units is connected to another of the multi-stage rocket units via at least one sliding connector. In one aspect, the super-staged rocket comprises at least some long multi-stage rocket units and some short multi-stage rocket units comprising fewer rocket engines than the long multi-stage rocket units.

According to another preferred embodiment, a multi-engine solid rocket stage comprises a plurality, such as at least twenty, of rocket engines as described, wherein: the plurality of rocket engines are connected in parallel so that more than one of the rocket engines may burn and provide thrust simultaneously, and nozzles of substantially all of the plurality of rocket engines are configured and positioned to expand gas into the atmosphere in a substantially same direction. The plurality of rocket engines may be integrally connected in parallel or adhesively connected in parallel.

In one aspect, each of at least most of the rocket engines comprises a fast-burning igniter located in its combustion cavity, wherein the igniter has at least one of a substantially higher burn rate and a substantially lower density than the propellant.

In one aspect, the multi-engine solid rocket stage is shaped as a stackable plate, and wherein corresponding points in the predetermined shapes of the plurality of rocket engines are substantially coplanar. A dimension of the plate perpendicular to the same direction may be at least twice a dimension of the plate parallel to the same direction.

In one aspect, a minimum wall thickness of propellant separating adjacent rocket engines in the multi-engine stage is sufficient to withstand a pressure differential equal to a combustion pressure inside a combustion cavity of one of the adjacent engines. In one aspect, the plurality of rocket engines comprises a substantially hexagonal configuration. In one aspect, nozzles of at least most of the rocket engines have throat diameters substantially smaller than maximum diameters of their respective combustion cavities.

In one aspect, the multi-engine stage has a substantially circular cross section and comprises a plurality of annuluses each comprising a plurality of rocket engines.

According to another preferred embodiment, a method of igniting a multi-engine solid rocket stage as described comprises: igniting at a first time substantially all rocket engines in a first of the plurality of annuluses; and igniting at a second time substantially all rocket engines in a second of the plurality of annuluses, wherein the second time follows the first time by a substantial fraction, but not more than approximately 50%, of a burn time of the rocket engines.

According to another preferred embodiment, a method for manufacturing the multi-engine solid rocket stage as described comprises: forming the propellant into a plate; forming a plurality of holes in the plate by at least one of molding the holes and boring the holes, whereby the holes define combustion chambers and nozzles of the plurality of rocket engines.

According to another preferred embodiment, a multi-engine solid rocket stage comprises a plurality of solid propellant rocket engines, each rocket engine comprising: a propellant formed into a predetermined shape comprising a combustion cavity and capable of deflagrating into hot, high-pressure gas upon ignition; and a nozzle configured and positioned to expand the hot, high-pressure gas into the atmosphere, wherein: the plurality of rocket engines are integrally connected in parallel so that more than one of the rocket engines may burn and provide thrust simultaneously, and nozzles of substantially all of the plurality of rocket engines are configured and positioned to expand gas into the atmosphere in a substantially same direction.

According to another preferred embodiment, a super-staged solid propellant rocket comprises a plurality of multi-engine solid rocket stages as described, the multi-engine solid rocket stages directly or indirectly stacked on top of each other. In one aspect, the plurality of rocket engines in each stage comprises at least twenty rocket engines, and wherein the plurality of multi-engine solid rocket stages comprises at least five stages, whereby the super-staged rocket comprises at least 100 individual solid propellant rocket engines.

In one aspect, each of at least most rocket engines in an upper stage of two adjacent multi-engine stages comprises a first fast-burning igniter located in its combustion cavity, wherein the first igniter has at least one of a substantially higher burn rate and a substantially lower density than the propellant, and wherein the super-staged rocket comprises a layer of a second fast-burning igniter located between the two adjacent multi-engine stages and configured to ignite the first fast-burning igniter of substantially every of the rocket engines in the upper stage.

In one aspect, each of the rocket engines in the upper stage has a burn time, wherein the second fast-burning igniter is configured to ignite the first fast-burning igniter of the substantially every of the rocket engines in the upper stage in substantially less than the burn time. In one aspect, the two adjacent multi-engine stages are connected substantially entirely via the layer, whereby deflagration of the second fast-burning igniter of the layer detaches the adjacent multi-engine stages.

The multi-engine solid rocket stages may be integrally or adhesively connected to each other. In one aspect, the super-staged rocket is configured so that, when a rocket engine in an upper stage is ignited by completion of a burn of a corresponding rocket engine in an adjacent lower stage, the upper and lower stages do not, as a whole, separate.

In one aspect, each of at least most rocket engines in an upper stage of two adjacent multi-engine stages comprises a first fast-burning igniter located in its combustion cavity, wherein the first igniter has at least one of a substantially higher burn rate and a substantially lower density than the propellant, and wherein the super-staged rocket comprises an array of electrical igniters located between the two adjacent multi-engine stages and configured to ignite the first fast-burning igniter of substantially every of the rocket engines in the upper stage.

In one aspect, the array comprises a plurality of high-gauge metal filaments, one filament for each of the at least most rocket engines in the upper stage, connected in parallel to two low-gauge wires, whereby when a sufficiently high voltage is placed across the two low-gauge wires, a sufficiently high resistive power is generated in substantially every filament to heat substantially every filament to exceed an ignition temperature of the first fast-burning igniter in a time period substantially less than a burn time of each of the at least most rocket engines in the upper stage. In one aspect, the super-staged rocket comprises a heat shield located between the two adjacent multi-engine stages and configured to substantially prevent ignition of any rocket engine in the upper stage by a burn of any rocket engine in a lower one of the two adjacent multi-engine stages.

In one aspect, the super-staged rocket has an approximately pyramid shape, whereby a cross-sectional area of an upper stage of the stacked multi-engine stages is smaller than that of a lower stage of the rocket. In one aspect, the multi-engine stages are stacked so that corresponding rocket engines in adjacently stacked stages are approximately vertically aligned with each other.

In one aspect, the super-staged rocket further comprises a heat retardant layer connected to and surrounding an external surface of the super-staged rocket and configured to prevent or retard a spreading of a flame to the external surface. In one aspect, the super-staged rocket further comprises a substantially impermeable wrapping configured to prevent or retard absorption of moisture by the propellant. In one aspect, the heat retardant layer is configured to at least one of burn and fall off the super-staged rocket at a rate comparable to a rate of consumption of the multi-engine stages. In one aspect, the heat retardant layer is not configured to withstand a combustion pressure inside a combustion cavity of any of the rocket engines.

According to another preferred embodiment, a super-staged rocket comprises at least 100 rocket engines, wherein the engines are distributed according to at least one of: a) at least five multi-engine stages connected in series, each stage comprising at least ten engines connected in parallel; and b) at least five multi-stage units connected in parallel, each unit comprising at least five engines connected in series.

In one aspect, an ignition of a first rocket engine in a stage is substantially independent of an ignition of a second rocket engine in a same or corresponding stage. In one aspect, the super-staged rocket is configured so that, when a rocket engine in an upper stage is ignited by completion of a burn of a corresponding rocket engine in an adjacent lower stage, the upper and lower stages do not, as a whole, separate. In one aspect, the super-staged rocket is configured so that, when a rocket engine in an upper stage is ignited by completion of a burn of a corresponding rocket engine in an adjacent lower stage, the upper and lower stages separate. In one aspect, the rocket engines comprise solid, liquid, or hybrid propellant rocket engines.

According to another preferred embodiment, a super-staged rocket comprises: a plurality of multi-engine stages, each multi-engine stage comprising a plurality of rocket engines, wherein for each of at least most rocket engines of each of at least most the multi-engine stages, an ignition of the each rocket engine is caused by completion of a burn of a corresponding rocket engine of an adjacent lower stage, wherein a time of the ignition is randomly distributed with respect to ignitions of other rocket engines in a same stage of the each rocket engine due to a random distribution of burn times of corresponding rocket engines in the adjacent lower stage.

In one aspect, the super-staged rocket is continuously staged, whereby at any time during a total burn of the plurality of multi-engine stages, at least one of the rocket engines is burning and providing thrust, and wherein the continuous staging is caused at least in part by a random distribution of ignitions of rocket engines in the each multi-engine stage. In one aspect, the super-staged rocket comprises at least 100 rocket engines. The rocket engines may comprise solid, liquid, or hybrid propellant rocket engines.

According to another preferred embodiment, a method of advertising comprises performing or inciting a person to perform at least one of the following steps a)–c): a) indicating an existence of a rocket, at least one of the rocket and a flight on which is commercially available for purchase; b) at least one of: indicating that the rocket includes at least 100 individual rocket engines; indicating that the rocket includes a plurality of stages and indicating that each stage includes at least ten rocket engines; and indicating that the rocket includes a plurality of multi-stage units and indicating that each unit includes at least ten rocket engines; and c) indicating that the rocket is at least one of safe and highly reliability due to that which is indicated in step b), wherein steps a)–c) are performed.

In another aspect, the method further comprises indicating that ignition times of rocket engines in a same stage are randomly distributed. In another aspect, the method further comprises indicating that, at any time during a total burn of the rocket, at least one of the rocket engines is burning and providing thrust. "Indicating" can include any way of indicating currently known in the art, such as but not limited to: explicitly stating with verbal, written, or other communication, implying or stating using other forms of understood communication, including body language, gestures, metaphors, innuendoes, showing using drawings, illustrations, gestures, etc. Further, as an example, "indicating that the rocket includes at least 100 individual rocket engines" includes, for example, indicating that the rocket includes 101 individual rocket engines, or at least 150 individual rocket engines, etc. Further, the indication need not be actually understood or observed by anyone. Further, an indication may be of an person's opinion, such as "indicating that the rocket is at least one of safe and highly reliable."

BRIEF DESCRIPTION OF THE DRAWINGS

FIG. 8b shows a variation of the embodiment shown in FIG. 8a.

DETAILED DESCRIPTION OF PREFERRED EMBODIMENTS

Figure 1:
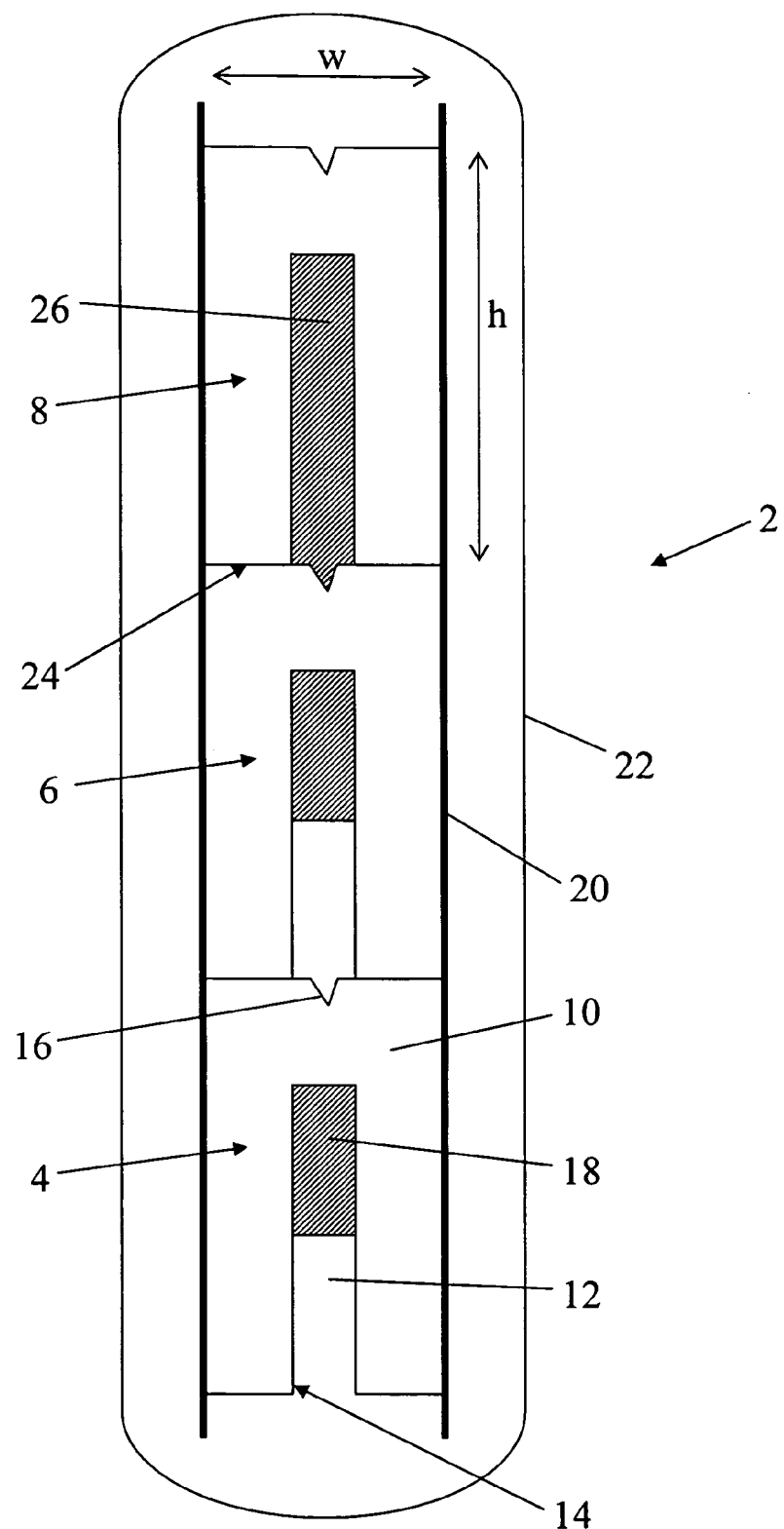
FIG. 1 shows a multi-stage unit according to an embodiment of the present invention.

In the following description, some drawings will show several possible variations of the present invention. It will be understood by one of ordinary skill in the art that many of these variations and/or features may be "mixed-and-matched," so that the scope of the present invention includes embodiments not specifically depicted in the drawings. Further, words such as "combust," "burn," "deflagrate," "decompose," may be used interchangeable at some points, even though, strictly speaking, fuel-oxidizer mixtures "combust," while decomposable materials "decompose."

Referring now to FIG. 1, a multi-stage solid propellant rocket unit 2 includes a plurality of solid rocket engines 4, 6, 8 connected in series such that substantially only one of the engines 4, 6, 8 imparts momentum to the unit 2 at any given time via its thrust-generating ability. Each rocket engine 4, 6, 8 is preferably (although not necessarily) constructed similarly, and includes propellant 10 formed into a predetermined shape, the predetermined shape including a combustion chamber or cavity 12, a nozzle 14, and an indentation 16. The predetermined shape shown in FIG. 1 is preferably substantially cylindrical (i.e., having a substantially circular cross section), although other shapes (e.g., having a square, triangular, or regular hexagonal cross section) are within the scope of the present invention. The combustion chamber 12 is also preferably cylindrical, but may have any shape currently known in the art, such as having a cross section that is: circular, star-shaped, progressively burning, regressively burning, etc. Internal propellant grain shapes and designs have been the subject of much study and research, so many possible and useful designs are well known in the art, and all such designs are within the scope of the present invention. Specifically, it is well known in the art how to shape a solid propellant grain to generate a multitude of thrust vs. time distributions and/or combustion chamber pressure vs. time distributions. All such shapes are within the scope of the present invention.

Propellant 10 is any solid propellant known, including but not limited to the following: oxidizers such as nitrates (e.g., potassium nitrate), nitrites, chlorates, perchlorates, solid versions of typically liquid or gaseous oxidizers (e.g., solid oxygen or solid nitric acid), etc.; fuels such as resins, rubbers, carbon-based fuels (such as carbon or sugars), metals (e.g., powdered aluminum), solid versions of liquid or gaseous fuels, etc.; decomposable materials (e.g., stabilized nitroglycerin, nitrocellulose, etc.). Propellant 10 may further comprise a binder, which may comprise a fuel, or the propellant 10 may be bound by melting or dissolution. For example, one simple and very inexpensive propellant combination is powdered or granulated potassium nitrate and sucrose, either melted together in a mixture called "caramel candy," bound together by dissolution in a preferably volatile solvent (such as alcohol), or bound together using a resin-type cement. Upon ignition of the propellant 10 inside the combustion chamber 12, the propellant 10 deflagrates to form hot, preferably high-pressure gases that may be ejected to the atmosphere via the nozzle 14.

In a preferred embodiment, propellant 10 is shaped so that it burns radially outwardly (as opposed, e.g., to a "cigarette end-burning" grain and other grains) so that the propellant 10 itself may serve either as a pressure-containing vessel for the combustion chamber 12 and/or as a heat retardant layer to prevent hot, high-pressure combustion gases from prematurely reaching layer 20 (discussed later).

The nozzle 14 is preferably formed as part of the predetermined shape of the propellant 10, so that an additional nozzle element need not be fabricated and attached to the engine 4. For example, the nozzle 14 may have a different cross sectional shape than that of the combustion chamber 12 (as will be explained with respect to FIG. 2), or it may have substantially the same cross sectional shape as the combustion chamber 12. In one embodiment, the combustion chamber 12 and nozzle 14 have a substantially circular cross section with a substantially equal diameter.

In such an embodiment, the nozzle 14 will burn (and thus become larger in diameter) as the propellant 10 in the combustion chamber 12 burns. It is well known that the burn rate inside the combustion chamber is roughly proportional to the exposed burning area Ab multiplied by the $n^{th}$ power of the combustion chamber pressure Pc (i.e., $m_{dot} \propto Ab \times Pc^n$), where n is preferably less than 1 to prevent a positive feedback loop. Further, the combustion chamber pressure Pc will vary both with the burning area Ab (which depends linearly on the combustion chamber radius r) and the "throat" area of the nozzle At (which depends on $r^2$). Therefore, during combustion of an engine 4 having a simple predetermined shape in which the combustion chamber 12 has a substantially constant circular cross section and the nozzle 14 has a substantially matched cross section, the combustion chamber pressure Pc in the combustion chamber 12 may decrease over time, and the thrust of the engine 4 may also change, because as propellant 10 burns radially outwardly, the burning area Ab only increases linearly with the chamber radius, while the throat area At through which hot, high pressure gases may flow increases as the square of the nozzle radius. For example, in this case (a simple cylindrical shape in which both the interior combustion chamber and exterior surface of the rocket 4 are cylindrical and the nozzle 14 has a cross section matched to the combustion chamber), the height h of the rocket may be selected relative to the width w of the rocket (as well as to the height and diameter of the combustion chamber, not shown) such that the timed combustion pressure distribution is within a predetermined, preferred range during the rocket engine burn.

Alternatively, the predetermined shape may be selected or designed to meet other pressure-time distribution or thrust-time distribution requirements. For example, in one preferred embodiment, the predetermined shape is chosen such that, during the course of the engine burn, the combustion pressure remains substantially constant. In another preferred embodiment, the predetermined shape is chosen such that, during the course of the burn, the engine thrust remains substantially constant, in spite of a continuous drop in combustion chamber pressure Pc. Methods and algorithms for determining and/or designing such predetermined shapes based on these preferred criteria are very well known in the art, and further explanation will not be given.

Figure 2:
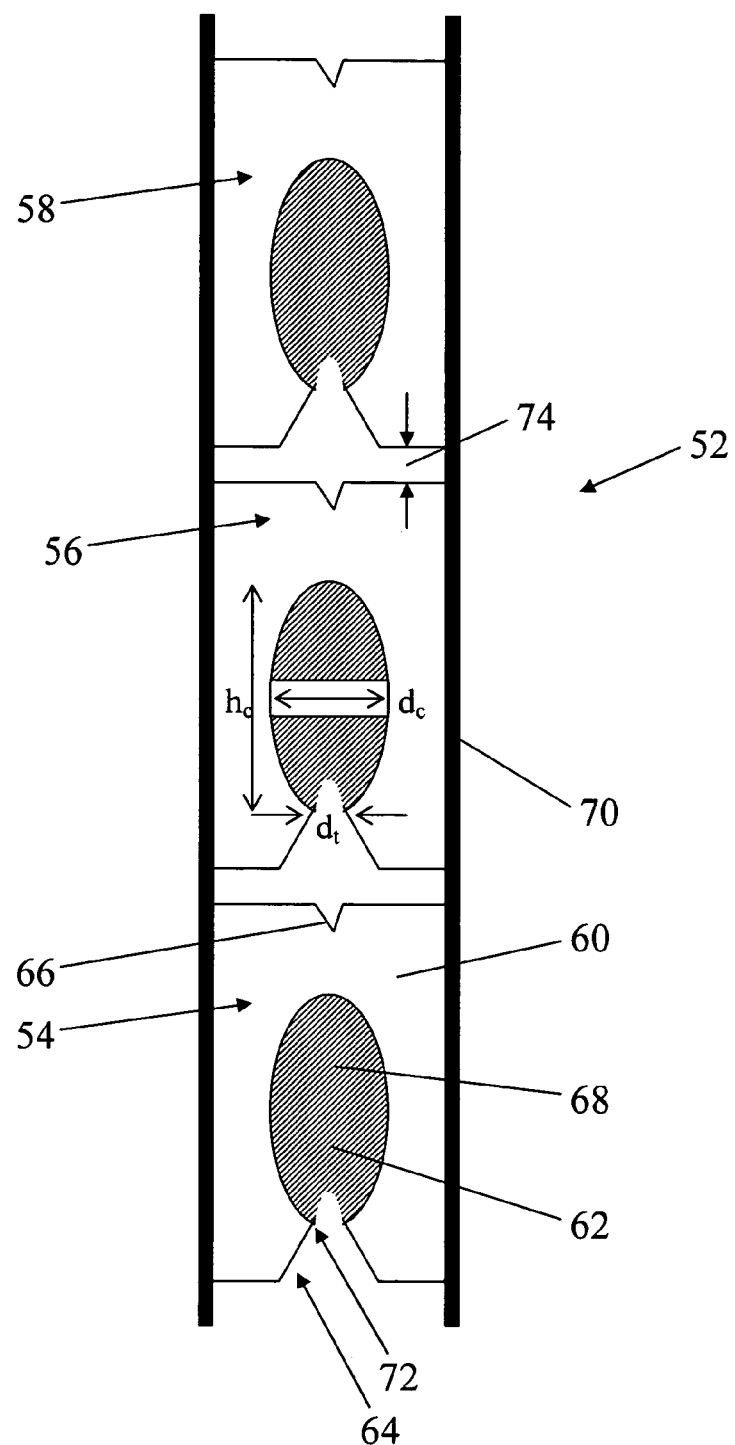
FIG. 2 shows a multi-stage unit according to another embodiment of the present invention.

In order to ignite substantially the entire burn surface of the propellant 10 inside the combustion chamber 12, a first igniter 18 is provided in the combustion chamber 12, preferably located throughout the combustion chamber 12 (such as shown in FIG. 2), or, if not, preferably located at or near an upper portion of the combustion chamber 12. The first igniter 18 comprises a fast-burning, preferably low density deflagratable material, such as a mixture of oxidizer and fuel (e.g., loosely packed and/or low density carbon-based black powder or other igniter having a high voids content), or a decomposable material, such as a nitrated fuel (e.g., loosely packed and/or low density smokeless powder). Because cellulose (such as cotton) already has a relatively low density and high voids content, nitrocellulose (particularly nitrated cotton) may be a good choice for first igniter 18. The combustion chamber 12 contains a sufficient quantity of first igniter 18 to, once ignited, raise the temperature of substantially all propellant 10 on the combustion chamber surface to an ignition temperature of the propellant 10. Alternatively or in addition, the combustion chamber 12 contains a sufficient quantity of first igniter 18 (and first igniter 18 has a sufficient density) to, once ignited, raise the pressure inside the combustion chamber 12 to a pressure approximately equal to a combustion pressure of the engine 4 during the engine burn.

The first igniter 18 preferably has a different chemical composition than the propellant 10, but need not. For example, first igniter 18 may have substantially the same chemical composition as propellant 10, differing primarily in density. For example, first igniter 18 may be formed having an artificially high voids content (such as bubbles), so that the density of the first igniter 18 is much lower than the propellant 10 and the available burning surface area per mass of the first igniter 18 is much higher than the propellant 10, so that it burns much more rapidly than the propellant 10. Methods of increasing the voids content and/or decreasing the density of a material are well known in the art. As discussed later, first igniter 18 may be adhesively, integrally, or frictionally connected to the side walls of combustion chamber 12, or may not be connected at all.

In operation, first igniter 18 is ignited, causing hot, preferably high-pressure deflagration/combustion products to form and to ignite the propellant 10 of the interior or combustion chamber surface of the combustion chamber 12. Once ignited, the propellant 10 burns radially outward, causing hot, high-pressure gases to form and to be accelerated through and ejected from nozzle 14 into the ambient atmosphere. This ejection causes an impulse reaction or thrust that imparts momentum to unit 2 in a direction opposite to a direction of ejection of the hot gases.

Indentation 16 is configured such that, once engine 4 reaches the end of its burn, the predetermined shape preferentially breaches/bursts and ejects the combustion chamber's hot, high-pressure gases at the location of the indentation 16. Further, indentation 16 is located at an end of the rocket 4 opposite the nozzle 14 such that, upon breach of the engine 4 at the indentation 16 (at or near the end of the engine's burn), the combustion chamber's hot, high-pressure gases are directed toward the nozzle 14 and/or combustion chamber 12 and/or first igniter 18 of the rocket engine 6 located in series directly above the spent rocket engine 4. These hot gases contact and ignite the first igniter 18 of the next rocket engine 6, causing the propellant 10 of the interior surface of the combustion chamber 12 of the rocket engine 6 to ignite and burn, causing hot, high-pressure gases to form and be ejected from the nozzle 14 of engine 6, creating thrust. The cycle then repeats for as many rocket engines are located in series.

Unit 2 shows only three rocket engines 4, 6, 8. However, in one embodiment, unit 2 may include a large number of stages, such as at least 5, or at least 10, or at least 20 stages, preferably connected in series, although not all such engines need be connected in series to be within the scope of the present invention.

A layer 20 preferably surrounds the rocket engines 4, 6, 8 at the exterior surface of the propellant's predetermined shape. The layer 20 is preferably an insulating or heat retardant layer configured to prevent deflagration of the propellant 10 from spreading to the external surface. Without such a layer 20, ignition of the propellant 10 would spread by heat conduction from the combustion chamber surface to a bottom of the engine (e.g., reference number 116 in FIG. 3), and finally to the rocket engine's external surface. Such deflagration should be avoided because it would consume the propellant 10 while generating no useful thrust. Layer 20 may be any substance or material that slows or retards or prevents ignition of the exterior surface of the rocket 4, 6, 8. For example, layer 20 may comprise plastic, paper, metal, wax, fiberglass, or other materials. It is acceptable for the layer 20 to be combustible in air (such as paper), because the rate of combustion may be sufficiently slow to substantially prevent the exterior surface of the predetermined shape of the rocket from igniting. However, preferably layer 20 will not deflagrate on its own in the absence of air (such as a decomposable material or mixture of fuel and oxidizer). Layer 20 may be omitted entirely.

Layer 20 may be applied to a series of connected rocket engines 4, 6, 8 as a sprayed-on or applied layer. For example, layer 20 may comprise an insulating hardening foam that is sprayed or applied to the external surfaces of the propellant 10. Alternatively or in addition, layer 20 may comprise a layer of material (e.g., paper, fiberglass, metal, etc.) that is rolled onto the series of connected rocket engines 4, 6, 8. For example, the series of connected rocket engines 4, 6, 8 may be placed on top of a large sheet of paper, and the series rolled up inside the paper, and the paper adhesively connected to itself during the rolling—like rolling a huge doobie. Alternatively or in addition, layer 20 may comprise a premade tube to which the rockets 4, 6, 8 are attached or connected.

Layer 20 may alternatively or in addition comprise a pressure-containing layer configured to withstand at least a substantial portion of the combustion pressure inside engines 4, 6, 8. For example, layer 20 may comprise a heat retardant or insulating material (as discussed), with sufficient thickness and/or reinforcements (such as cable reinforcements) to withstand a high pressure. For example, assume that the engine 4 has a predetermined shape and igniter 18 that are configured to cause the engine 4 to burn with a combustion chamber pressure Pc that starts at 500 psi and decays down to 250 psi at or near the end of the engine's burn. Pressure-containing layer 20 is preferably configured to withstand a pressure of at least 100 psi, preferably at least 250 psi, and more preferably more than 250 psi, such as at least 350 psi. Layer 20 may be configured to withstand a pressure sufficient such that rocket 4 is configured to breach (at or near the end of its burn) only at indentation 16, so that the exterior sides of the rocket 4 substantially remain intact after the breach.

Because the predetermined shape of the propellant 10 will inherently act, at least to some degree, as a pressure-containing layer, pressure-containing layer 20 need not necessarily be configured to withstand the highest combustion chamber pressure in the combustion chamber 12 (which highest pressure is likely to occur at the beginning of the burn, depending on the design of engine 4). Further, layer 20 need not necessarily be pressure containing at all (e.g., layer 20 may only be a foam-type insulating layer), if the indentation 16 is sufficiently deep to cause the engine 4 to breach before the combustion chamber pressure causes the rocket 4 to explode. However, there may be an engineering tradeoff to be made here. Without a pressure-containing layer, the rocket 4 may be simpler in design and easier and cheaper to manufacture. However, such a design may require an excessive quantity of ultimately unused propellant 10, which may be inefficient if the propellant 10 is structurally a weak material. However, if the propellant 10 comprises a hard, sturdy plastic embedded with oxidizer particulates, then the propellant 10 itself may be sufficient strong to act fully as its own pressure-containing layer/chamber. On the opposite end of the design spectrum, propellant 10 may be a very weak material (e.g., a rubbery propellant comprising a rubber fuel embedded with an oxidizer), in which case the layer 20 should be sufficiently strong to withstand the maximum combustion chamber pressure Pc. In any event, the rocket 4 should preferably be designed such that the combustion chamber pressure is sufficiently contained (whether by the propellant 10 itself, the pressure-containing layer 20, or both) at least until the intentional breach occurs at the location of indentation 16. Rocket 4 could, of course, be designed to explode at its sides, but such is not preferred.

The unit 2 may be wrapped in wrapping 22, such as an air and/or water impermeable wrapping. While shown diagrammatically as a large bubble surrounding the unit 2, in fact the wrapping 22 is preferably a tight seal or wrapping, such as a plastic wrap or "shrink wrapping." Wrapping 22 is preferably impermeable so as to prevent the atmosphere from affecting or changing the composition of the propellant 10 or igniter 18 before ignition of the unit 2. For example, moisture absorbed into propellant 10 or igniter 18 from the air can be severely detrimental to the unit's performance. Wrapping 22 may surround the entire unit 2, or it may cover only those parts of propellant 10 that are exposed (e.g., the bottom portion). Wrapping 22 need not be a continuous sheet. For example, it may comprise a paint or sealant that is applied or sprayed onto the exposed parts of propellant 10. Wrapping 22 may help preserve the unit 2 so that the unit 2 may be effectively ignited and used without substantial preparations (such as for military use). Further, igniter 18 may in addition or alternatively be enclosed in a substantially impermeable wrapping, so as to prevent absorption of moisture by the igniter 18.

A single engine 4, 6, 8 may be formed (e.g., before application of layer 20) by the following methods. First, a mold having the preferred shape of the external surface of the rocket engine 4, 6, 8 (including indentation 16) may be filled with a molten form of the propellant 10. Next, a mandrel having the preferred shape of the combustion chamber may be pushed into the molten propellant 10, and the propellant 10 allowed to cool and solidify. The propellant 10 may be cooled by air or water, or may be rapidly cooled using a cryogen in order to obtain a desired material structure. The mandrel is preferably extremely smooth and not easily bondable with the propellant 10, and/or is coated with a slippery or lubricating substance (e.g., oil) to allow the mandrel to be easily removed from the solidified propellant 10. Various methods of using and removing mandrels are well known in the art, and are within the scope of the present invention. After removal of the mandrel, the solidified propellant 10 may be removed from the mold. Again, the mold may be of a form and/or made of a material sufficient to allow the easy removal of the propellant 10.

The mandrel and/or mold may include tiny closely-spaced orifices that allow a lubricant to be forced or pressure-fed into the gap between the solidified propellant 10 and the mold or mandrel, so that the solidified propellant 10 is easily separated from the mold or mandrel. Further, the mold and/or mandrel may be slightly compressible to allow a fluid (e.g., lubricant) to be forced between the propellant 10 and mold and/or mandrel to allow for easy removal. Further, the mandrel may be dynamically shaped so that the shape may change during and after forming the combustion chamber 12. For example, the mandrel may be inflatable (or mechanically made larger) so as to form a combustion chamber having a variable cross section and/or a diameter dc larger than the nozzle throat diameter $d_t$ (as in FIG. 2). After the propellant 10 has solidified, the mandrel may be deflated (or mechanically reduced in size) so as to be able to remove the mandrel from the combustion chamber 12 via the smaller diameter nozzle throat.

Alternatively to pouring molten propellant 10 into the mold, a mixture of granulated or powdered propellant (such as a thoroughly mixed mixture of powdered oxidizer with powdered fuel, or a granulated decomposable material) with a binder may be poured into the mold. The mandrel, which is of a material and design to prevent bonding with the propellant 10 (such as by making the mandrel very smooth and/or coating with a slippery material such as wax or oil), may then be inserted and the binder in the propellant 10 allowed to dry and/or chemically react, so as to solidify the predetermined shape. Alternatively, a mixture of granulated or powdered propellant with a volatile solvent into which at least one of the propellant components is dissolvable may be poured into the mold. The mandrel, which is of a material and design to prevent bonding with the propellant 10, may then be inserted and the solvent in the propellant 10 allowed to evaporate, so as to solidify the predetermined shape.

Further, instead of or in addition to using the mold and/or mandrel, the solidified propellant 10 (whether integrally bonded by melting or dissolution in a volatile solvent, or adhesively bonded) may be shaped using conventional tools, such as milling machines, lathes, drills, and other cutting and shaping instruments. For example, a cylinder of propellant 10 may be formed using a simple, conventional, cylindrical mold. Next, the indentation 16 may be formed by drilling into the solidified propellant 10. Next, the combustion chamber 12 may be formed by drilling into the solidified propellant 10. The exterior surface of the solidified propellant 10 may optionally be smoothed/perfected by cutting with a lathe, as may top and bottom ends of the propellant 10 with a milling machine. Methods of boring holes having varying diameters are well known in the art. Therefore, the diameter $d_t$ of the nozzle throat (see FIG. 2) may be made different (e.g., smaller) than the diameter $d_c$ of the combustion chamber 12 by using various known drilling/boring tools. Further, the mold/mandrel and machining methods may be used in conjunction. For example, a solidified propellant 10 having a cylindrical combustion chamber 12 may be easily formed using the above discussed mold/mandrel method, and the combustion chamber 12 may subsequently be shaped so that the throat diameter differs from the combustion chamber diameter using the above discussed machining method. Rocket engines 4, 6, 8 may be made very quickly, cheaply, repeatably, and accurately according to the above method by using, e.g., a pre-programmed computer numerical computation (CNC) machine.

Next, the first igniter 18 may be placed inside the combustion chamber 12. If the first igniter 18 has a substantially lower melting temperature than propellant 10, then first igniter 18 may be poured into the combustion chamber 12 of propellant 10 (which is preferably solidified, but maintained at or near the temperature of the igniter 18) to the preferred quantity and then allowed to cool and solidify. As with the propellant 10, first igniter 18 may instead be placed inside the combustion chamber 12 as a granulated mixture with a binder that dries and/or chemically reacts to solidify the igniter 18 inside the combustion chamber 12. Also as with the propellant 10, first igniter 18 may instead be placed inside the combustion chamber 12 as a granulated mixture with a volatile solvent that dissolves at least one of the chemical components of first igniter 18 and subsequently evaporates to solidify the igniter 18 inside the combustion chamber 12. Alternatively, first igniter 18 may comprise a loose packaging (not shown) of igniter, where the packaging is held adhesively or by friction inside the combustion chamber 12. If the first igniter 18 is compressible (such as a rubbery igniter having a high voids content and/or a nitrated fiber, such as nitrated cotton), a predetermined quantity of first igniter 18 may simply be physically pushed into the combustion chamber 12 and held in place by frictional contact with the combustion chamber surface. Alternatively, first igniter 18 may be pre-formed, such as into a solid cylinder small enough to slide into the combustion chamber 12, and inserted into the combustion chamber and physically held in place using a mechanical spacer (which may be nothing more than a cheap piece of plastic, possibly with a slight spring shape, that separates the bottom of the pre-formed igniter 18 with a top surface of an adjacent lower rocket engine). Further, if the pre-formed first igniter 18 is long enough to fill substantially the entire height of the combustion chamber 12, then no such mechanical spacer is necessary, as the first igniter 18 is held in place between the upper surface of the combustion chamber 12 and the top surface of an adjacent lower rocket engine. In other words, first igniter 18 need not necessarily be adhesively, integrally, or frictionally connected to the sides of the combustion chamber surface, to be within the scope of the present invention.

Further, referring to engine 8 in FIG. 1, the first igniter 18 itself may be used as a kind of non-removable mandrel. For example, in the case of forming the predetermined shape by cooling molten propellant 10, if the first igniter 18 has a substantially higher melting temperature than the propellant 10, a pre-formed cylinder 26 (with a notch corresponding to and being the inverse of indentation 16) of first igniter 18 may be inserted into the molten propellant 10 so as to displace the propellant 10 in such a manner that the volume taken by pre-formed igniter 18 will, after combustion of the igniter 18 and ignition of the engine, serve as the initial combustion chamber surface. After insertion of the first igniter 18 into the molten propellant 10, the propellant 10 is allowed to solidify, and the resulting engine has the desired predetermined shape with a combustion chamber 12 that is fully filled with first igniter 18. In the case of forming the predetermined shape by integrally binding/dissolving the propellant 10 using a volatile solvent or adhesively binding the propellant 10 using an adhesive binder, the first igniter 18 need not have a melting point substantially higher than that of the propellant 10, but may or may not be reactive or dissolvable in the binder or solvent, respectively. Preferably, the first igniter 18 remains substantially intact during forming of the predetermined shape of propellant 10, so as to ensure that the shape of the combustion chamber 12 (as formed by the outer surface of the first igniter 18 serving effectively as a non-removable mandrel) is predictable and reproducible. There are several advantages to this design: 1) a separate mandrel need not be used, thus prevent the additional cost and labor of working with a mandrel, as well as the problems associated with removing a mandrel; 2) virtually any combustion chamber shape may be easily formed without the need for using a complicated (e.g., inflatable) mandrel and without complicated machining, because the first igniter 18 can be formed in varying and/or complicated shapes by conventional machining methods (e.g., using a lathe); and 3) it is very easy to manufacture a multi-stage unit 2 where the stages are integrally connected (as discussed later).

In the embodiment shown in FIG. 1, engines 4, 6, 8 are preferably attached to each other at interfaces 24 to form unit 2. At interfaces 24, a bottom portion of one engine (e.g., engine 8) is connected to a top portion of a lower adjacent engine (e.g., engine 6). The connection may be adhesive, whereby an adhesive is applied between the connected surfaces and allowed to dry or harden, thus connecting the surfaces. Adhesives are very well known in the art. They may include a volatile evaporation-type adhesive or glue, as well as an adhesive that hardens upon mixture and reaction with another substance. One example of such an adhesive is one that absorbs moisture from the air and reacts with the moisture to harden. Another example is one in which two substances are mixed (such as an epoxy resin and hardener) and chemically react over a relatively short time to harden. Any known adhesive is within the scope of the present invention. In one embodiment, the unit 2 may be formed by manufacturing a large number of engines 4, 6, 8, and then connecting them at interfaces 24 via an adhesive.

The connection at interfaces 24 may also be integral, whereby no adhesive is used. For example, the connection may be a melted, welded, or dissolved connection, such that on a microscope level, the structure of the propellant 10 deep within the predetermined shape is not substantially different than the structure of the propellant 10 at the interface 24.

The unit 2 may be formed a number of ways. First, a plurality of engines 4, 6, 8 may be manufactured, preferably according to one of the methods described previously. The engines 4, 6, 8 (and, of course, more if desired) may be placed end to end, and preferably heated to near the melting point of the propellant 10 (but not so near that the predetermined shape begins deforming). A small quantity of molten propellant 10 may be placed between the end surfaces of adjacent engines and the engines pressed together to smooth out the molten propellant 10 if desired. The molten propellant 10 is then allowed to integrally bond with the propellant 10 at the end surfaces, and allowed to cool and solidify. If done properly, the result is an integral connection between the adjacent engines.

Alternatively, the plurality of engines 4, 6, 8 may be placed end to end (not necessarily heated to near the melting temperature) and a small quantity of an adhesive placed between the end surfaces. The engines may be pressed together to smooth out the adhesive, if desired, and the adhesive allowed to dry and/or chemically react. Alternatively, and particularly if the predetermined shape of the engines is formed using a volatile solvent to bind the propellant 10, the plurality of engines 4, 6, 8 may be placed end to end (not necessarily heated to near the melting temperature) and a small quantity of a volatile solvent placed between the end surfaces and the engines pressed together if desired. The solvent is allowed to dissolve at least one of the component chemicals of the propellant 10 in each of the end surfaces of the adjacent rocket engines, and subsequently allowed to evaporate. Heating may be used to accelerate evaporation of the solvent. If done properly, the result is an integral connection between the adjacent engines.

Once all engines have been connected according to the above methods, the unit 2 may be coated in layer 20, such as by spraying or applying the layer 20 to an external surface, or by rolling the unit 2 in a material such as paper, etc., as previously discussed. Then, the unit 2 may be wrapped in wrapping 22 to allow for long-term storage by preventing absorption of moisture, etc., by the propellant 10.

In another embodiment, instead of pre-fabricating a plurality of rocket engines 4, 6, 8 and connecting them together, the unit 2 may be formed in a continuous method. For example, layer 20 may comprise a pre-made, preferably sturdy tube. At the bottom of the tube (the bottom for manufacturing is actually the top of the rocket) there may be a mold having a flat shape with a protruding notch corresponding to indentation 16, or only a flat shape if the top rocket stage of unit 2 does not need an indentation 16 to ignite an adjacent upper stage. Then, first igniter 26 acting as a non-removable mandrel is mechanically held in the desired position, while unsolidified propellant 10 is poured into the tube 20. Again, the propellant 10 may contain an adhesive binder or a volatile solvent, or any other means of binding known in the art, or may be molten. If molten, preferably the tube 20 and igniter/mandrel 26 are heated to near the melting temperature of propellant 10, so that propellant 10 does not immediately solidify upon touching these elements. Propellant 10 may be mechanically packed down to remove any gaps, voids, or imperfections in the unsolidified propellant grain. The filling of propellant 10 may occur at a rate sufficiently slow that as the propellant level nears the top of igniter/mandrel 26, the bottom regions of the propellant 10 have substantially solidified, so that igniter/mandrel 26 is substantially held stationary in the solidified propellant regions. At this point, the mechanical hold on igniter/mandrel 26 may be released, and the mechanical holding device (not shown) may be used to hold another igniter/mandrel 26, spaced above the adjacent lower igniter/mandrel 26 by the desired distance. Then, adding of unsolidified propellant 10 is continued, so that eventually the lower igniter/mandrel 26 is completely covered and the adjacent upper igniter/mandrel 26 begins to be encompassed by propellant 10, and the cycle starts again and repeats until the unit 2 is fully formed.

Many variations on the above method are within the scope of the invention. For example, instead of filling a tube 20 with propellant 10, the unit 2 may be formed in a mold, removed from the mold, and either wrapped or covered with layer 20, which may be only a heat retardant layer, but could be pressure containing. Further, the mechanical holding device to hold the igniter/mandrel 26 during propellant loading may comprise a mechanical connection between a plurality of igniters/mandrels 26, such as typical fiber rope (e.g., cotton or a synthetic, such as polyester) or metal or fiberglass cable (not shown). For example, ten igniters/mandrels 26 may be molded and/or formed and/or machined directly onto a continuous cable, which passes axially through their centers. Then, the cable of igniters may simply be stretched from one end of tube 20 to the other, so that the cable is approximately aligned with the axis of the tube 20. Then, propellant 10 may be filled in the tube 20, whereby the igniters/mandrels 26 and cable displaces the propellant 10. An advantage to this method is that the propellant 10 need not continuously dry/harden/solidify during propellant loading; the propellant 10 may be partially or fully loaded and subsequently allowed to solidify. In one embodiment the cable is combustible (but preferably only in air, such as cotton rope) so that it burns away as each subsequent stage burns. In another variation, the igniter/mandrel 26 need not be a solid piece; it may be hollow or varying in density. In another variation, the igniter/mandrel 26 may comprise an outer layer that may or may not be combustible with or without air. For example, if the igniter/mandrel 26 comprises a very porous material, some of these pores may, during forming of the combustion chamber 12 with igniter/mandrel 26, cause inverted protrusions in the propellant grain. This may be prevented by coating the igniter/mandrel 26 with a layer to smooth it out.

Referring now to FIG. 2, a multi-stage solid propellant rocket unit 52 comprises a plurality of rocket engines 54, 56, 58 (but preferably includes more, such as at least five, at least 10, or at least 20). Each rocket engine 54, 56, 58 comprises propellant 60 having a predetermined shape, the predetermined shape including a combustion chamber 62, a nozzle 64, and an indentation 66. Each rocket engine 54, 56, 58 includes a first igniter 68 located inside the combustion chamber 62, and the unit 2 includes a layer 70 surrounding and connected to the engines 54, 56, 58. In FIG. 2, a variation is shown that is similar to the embodiment shown in FIG. 1, but differs in at least the following ways. First, instead of a cylindrical combustion chamber 12, the combustion chamber 62 is substantially oval in cross section, as shown, so that a diameter (particularly a maximum diameter dc) of the combustion chamber is larger (and perhaps even substantially larger) than a diameter $d_t$ of the nozzle throat 72. Of course, as previously discussed, the combustion chambers 12, 62 may have any desired shape, such as a progressively or regressively burning grain, and algorithms for producing grains exhibiting desired thrust-time and pressure-time distributions are well known. The dimensions of the combustion chamber, including combustion chamber diameter dc, nozzle throat diameter $d_t$, and height $h_c$, may be selected to meet desired burn parameters.

Second, because the embodiment in FIG. 2 allows for varying combustion chamber and nozzle diameters, nozzle 64 also includes an diverging expansion region, shown in FIG. 2 as a cone shape directly below the nozzle throat 72, which further expands and accelerates exhausted hot product gas so as to produce more thrust for a given hot gas mass flow rate. The dynamic dimensions/diameters of the combustion chamber 62 and nozzle 64 can be created by any of the methods discussed, such as using an inflatable or otherwise mechanically enlargeable mandrel, using conventional machining tools, using a non-removable igniter/mandrel 26 (FIG. 1), and so forth.

Third, instead of the engines 4, 6, 8 being directly connected end to end, engines 54, 56, 58 are connected to each other via layer 70, and ends of engines 54, 56, 58 are separated by a gap 74. Gap 74 may be large or so small that ends of the rockets 54, 56, 58 are touching. Layer 70 must, therefore, be a structurally supporting layer, as it must provide the mechanical structure to hold and sturdily support all of the engines 54, 56, 58. Layer 70 may comprise any of the materials previously discussed, which is practically any possible material except a fast-burning fuel-oxidizer mixture or decomposable substance. In a preferred embodiment, layer 70, because it must already be sufficiently strong to support unit 52, should also be a pressure-containing layer so that it can withstand at least a substantial portion of a combustion chamber pressure (as well, of course, as a heat retardant layer to prevent ignition of the exterior sides of engines 54, 56, 58). In a preferred embodiment, layer 70 comprises a material that does not fracture into shrapnel upon explosion, such as paper, fiberglass, some plastics, etc. Alternatively or in addition, layer 70 may comprise a combustible material that preferably burns or melts away at a rate similar to spending of the engines 54, 56, 58, such as paper or plastic. Engines 54, 56, 58 may be connected to the layer 70 in any of the ways previously discussed, such as adhesively, by melting the propellant 60 to the layer 70, by friction (where the layer 70 is very tightly wrapped around the engines), and so forth.

Unit 52 may be formed by fabricating a plurality of engines 54, 56, 58. The engines may then be placed end-to-end, separated by gaps 74, on a large sheet of the material comprising layer 70. The sheet may or may not be applied with an adhesive to adhere to engines 54, 56, 58, and the sheet may be tightly rolled up around the engines onto itself. Adhesive or other connecting means may be applied to the sheet as it is being rolled onto itself to hold the sheet in placed, and the rolling may or may not be repeated many times to form a layer 70 that is thick enough to act as both a structural layer and a pressure-containing layer. Alternatively, layer 70 may comprise a pre-fabricated tube, having an inside diameter at, slightly smaller than, or slightly larger than an outer diameter of engines 54, 56, 58. Depending on the tightness of the clearance, engines 54, 56, 58 may be forced into tube 70 and held in place by friction, and/or comfortably inserted into the tube 70 and held in place using an adhesive or molten propellant 60, etc.

In operation, unit 52 is ignited at bottom engine 54 via first igniter 68, which burns inside the combustion chamber 62 to generate hot, high pressure gas, which subsequently expands through throat 72 and accelerates from nozzle 64 to the atmosphere (or space, for space applications), generating an impulse reaction thrust. Layer 70 preferable contains some or all of the combustion chamber pressure, so that a majority of the propellant 60 burns before reaching the indentation 66, at which point the engine 54 breaches and hot, high-pressure gas shoots upward toward the nozzle 64 of engine 56. The cycle begins again. In the meantime, residual propellant 60 in spent engine 54 continues to burn, and preferably the portion of layer 70 surrounding spent engine 54 also burns in the air (or melts away) as engine 56 burns. Layer 70 need not burn or melt away, as engines 54, 56, 58 will still create thrust in series, but if layer 70 burns or melts away, the total mass of the system will decrease with the engine burns and thus the efficiency of the unit 52 will increase.

Figure 3:
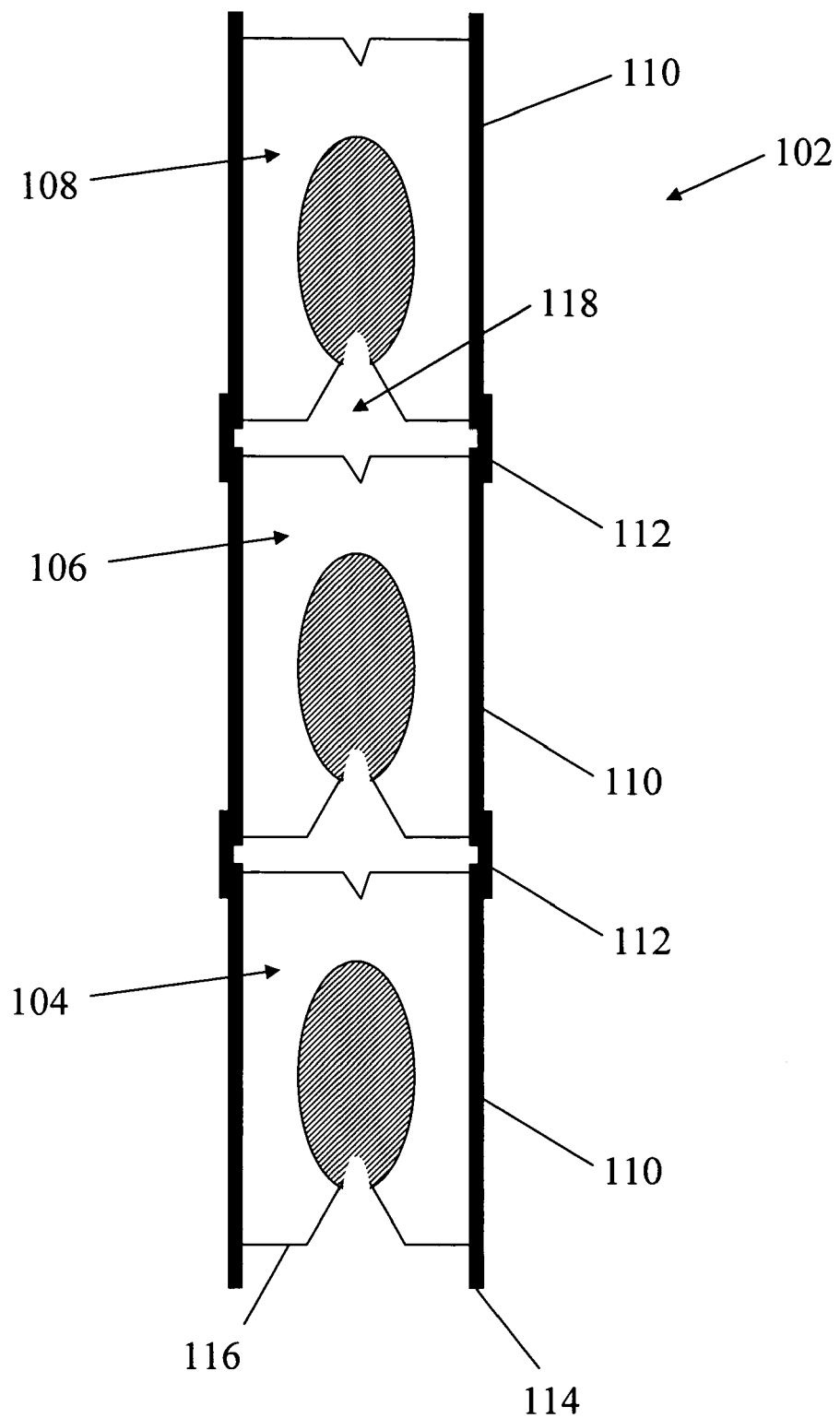
FIG. 3 shows a multi-stage unit according to another embodiment of the present invention.

Referring now to FIG. 3, a multi-stage solid propellant rocket unit 102 comprises a plurality of rocket engines 104, 106, 108, each engine comprising elements corresponding to those shown in FIG. 2, with these exceptions. First, each engine preferably comprises its own layer 110, which is preferably a structure providing layer, preferably a pressure-containing layer, and preferably a heat retardant layer. In other words, each engine 104, 106, 108 is preferably a self-contained rocket engine. The engines are connected by connectors 112, which may comprise any material sufficiently strong to sturdily hold a plurality of engines 104, 106, 108 together. Connectors 112 are preferably disconnectable upon spending of a lower stage. For example, connectors 112 may comprise a material that either burns away (such as paper) or melts away (such as plastic), or comprises a material that is frangible or breakable or disconnectable upon the force of high pressure. Further, connectors 112 may comprise an oxidizer-included propellant (e.g., any of the oxidizer-fuel mixtures and decomposition compounds discussed). Such materials are known in the art and will not be further discussed herein. Thus, upon ignition of an adjacent upper stage, the region 118 between the upper stage and the lower spent stage fills with hot, high-pressure gas that disconnects connector 112 either: a) by burning or melting the connector 112 (by the heat of the gas); or b) by breaking the connector 112 (by the pressure of the gas); or c) by igniting the oxidizer-included propellant to turn the connector 112 into hot product gas; or d) a combination of any of these. The result is that spent stages simply drop off unit 102, thus reducing the mass of unit 102 during use and increasing efficiency. While ends 114 of layers 110 are shown for explanation as being separated, they may be in direct contact. Further, while ends 116 of the predetermined shapes of the propellant are shown for explanation as being separated, they may be in direct contact.

Figure 4:
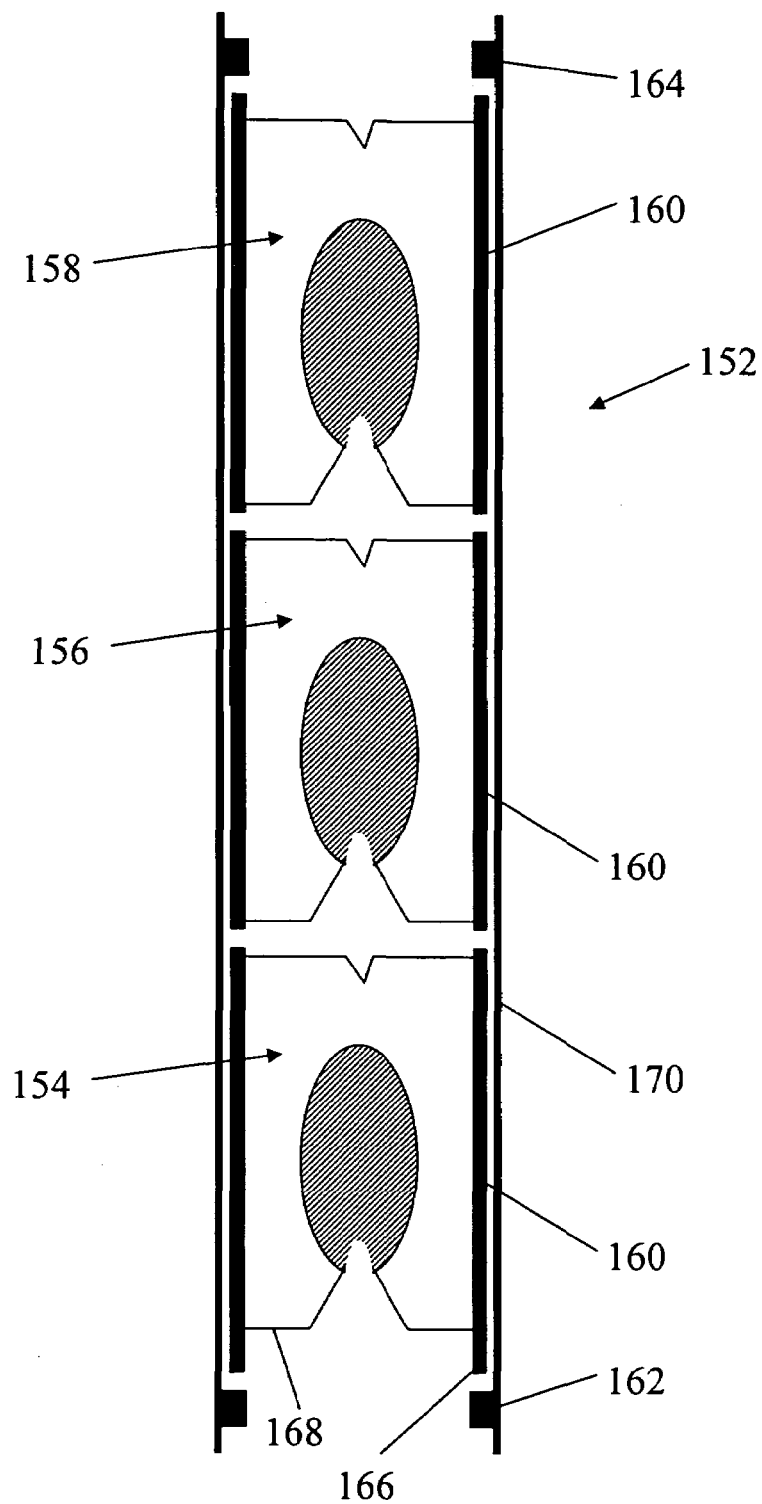
FIG. 4 shows a multi-stage unit according to another embodiment of the present invention.

Referring now to FIG. 4, a multi-stage solid propellant rocket unit 152 comprises a plurality of rocket engines 154, 156, 158, which may be similar to the engines 104, 106, 108 in FIG. 3. Each engine has a layer 160 that may be at least one of a structure providing layer, a pressure containing layer, and a heat retardant layer. Further, the unit 152 comprises a structure providing outer layer or tube 170 into which the engines 154, 156, 158 preferably freely slide. Tube 170 is preferably a structure providing layer, and may be a pressure containing layer and/or a heat retardant layer.

At an upper end of the tube 170 is a stop 164, configured to prevent the slidable rockets 154, 156, 158 from sliding beyond stop 164, particularly during burn and thrust generation. At a lower end of the tube is a stop 162, configured to prevent the slidable rockets 154, 156, 158 from sliding beyond stop 162. Stop 162 need not necessarily be as sturdy or strong as stop 164, because stop 162 primarily needs to support only the total weight of engines 154, 156, 158, while stop 164 needs to support the maximum thrust of each engine, which is preferably greater than the total weight of the engines. Stop 162 is also preferably configured to burn, deteriorate, melt, or otherwise be disconnected after ignition of the bottom engine stage 154, so that upon spending of engine 154 and ignition of adjacent upper stage 156, engine 154 may freely slide down and out of tube 170, preferably under the action of the hot, high-pressure gas that is being ejected from engine 156. For example, stop 162 may comprise a fast-burning oxidizer-included propellant that quickly deflagrates upon ignition of engine 154. Once unit 152 is ignited, no force is needed to keep thrust-producing engines from falling down and out of tube 170, for pretty obvious reasons. There may or may not be a large gap between layers 160 and 170, and layers 160 and 170 may or may not be very smooth or be coated with a lubricant, to help facilitate easy sliding of engines 154, 156, 158 inside tube 170.

In addition or alternatively, engines 154, 156, 158 may be held inside tube 170 by frictional contact, in which case stops 162, 164 may or may not be necessary. For example, the outer layers 160 of the engines may be coated with a compressible, preferably lightweight material, such as Styrofoam™ or an equivalent, so that the coating causes a frictional force against the layer 170 to keep the engines in place. Further, while ends 166 of layers 160 are shown for explanation as being separated, they are preferably in direct contact. Further, while ends 168 of the predetermined shapes of the propellant are shown for explanation as being separated, they may be in direct contact. Preferably, tube 170 may be designed to remain intact (e.g., it may comprise a sturdy metal), but it may be configured to burn, melt, vaporize, etc. during spending and subsequent dropping out of engines 154, 156, 158.

Figure 5:
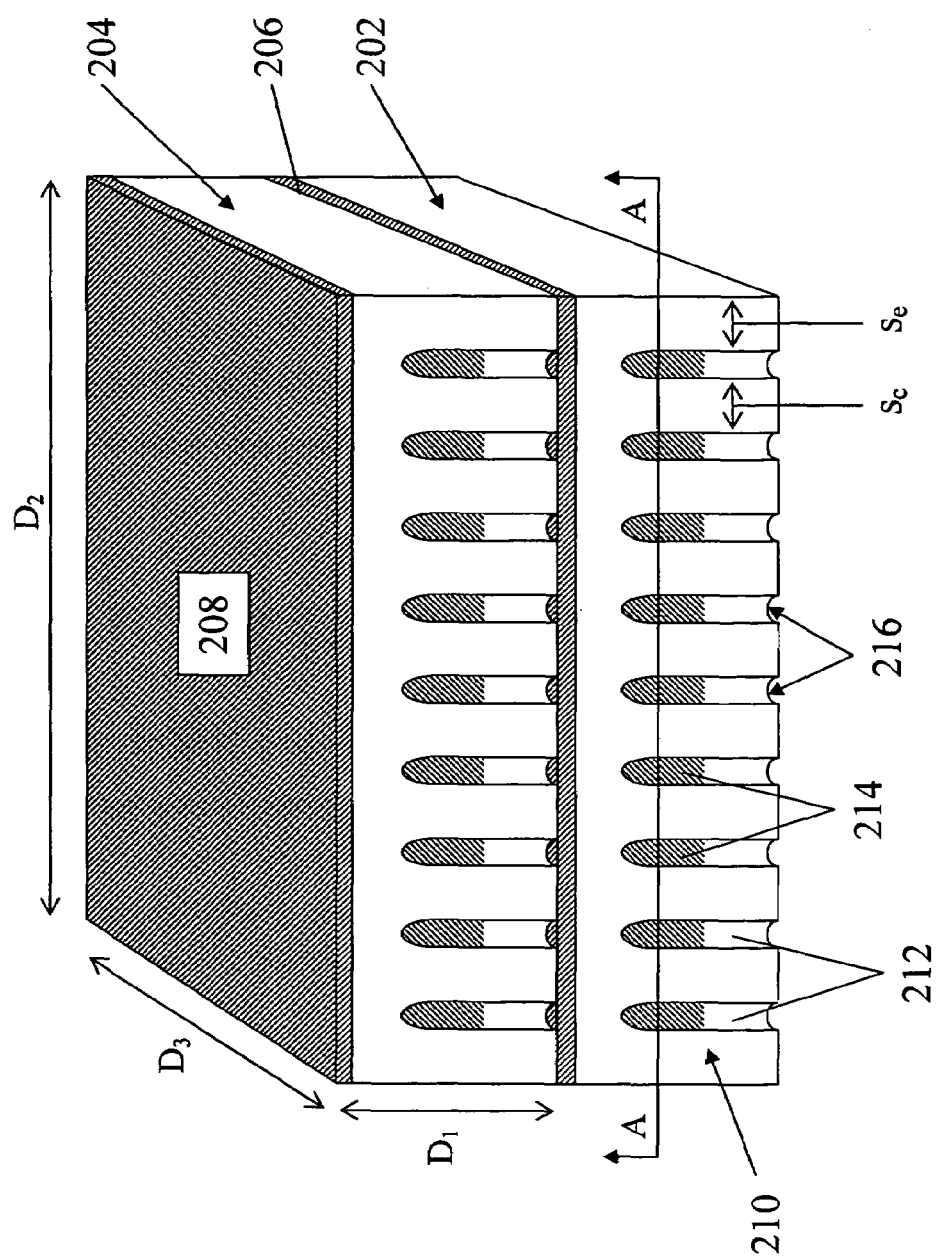
FIG. 5 shows a multi-engine stage according to another embodiment of the present invention.
Figure 8A:
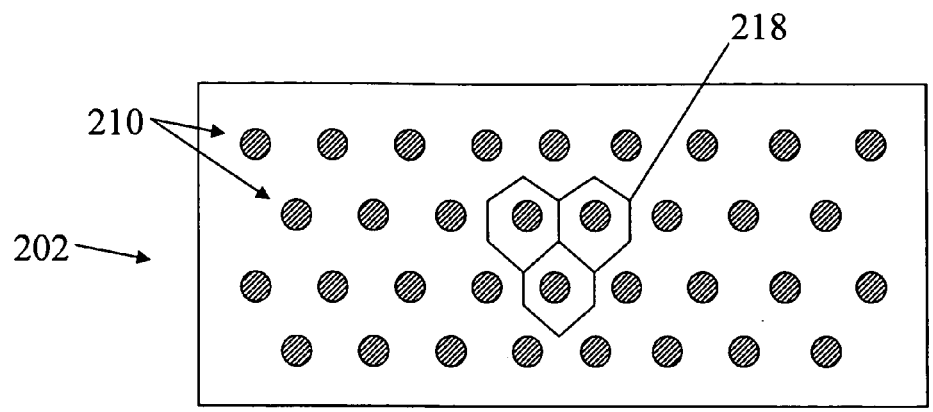
FIG. 8a shows a cross section of the embodiment shown in FIG. 5 through section A—A.

Referring now to FIGS. 5 and 8a, a lower multi-engine solid propellant rocket stage 202 is shown connected to an adjacent upper multi-engine stage 204 via a second igniter 206. First stage 202 comprises a plurality of engines 210 integrally connected in an efficient arrangement, such as a hexagonal configuration 218 (FIG. 8a), and connected in parallel so that they are capable of burning and generating thrust at substantially the same time. Each engine 210 comprises a combustion chamber 212 and a nozzle 216, the combustion chamber 212 containing a first igniter 214. Of course, each rocket engine 210 may have any of the shapes, features, or configurations of the engines previously discussed, such as where the nozzles 216 have dimensions smaller than dimensions of the combustion chambers 212. As shown, combustion chambers 212 are substantially cylindrical and nozzles 216 have dimensions substantially matched to the combustion chambers 212.

Of course, the engines 210 need not be integrally connected. For example, stage 202 may comprise a plurality of separately fabricated engines 210, each engine 210 having an outer cross section that is suitable for parallel connection, such as a triangular shape, a square shape, or a hexagonal shape 218 (as in FIG. 8a), and the engines 210 connected with an adhesive. The engines 210 may also be integrally connected by separately fabricating the engines 210 and then connecting them using molten propellant and/or a volatile solvent. However, in a preferred embodiment, the engines 210 are integral in that they are all fabricated from a single plate 202 of propellant.

For example, stage 202 may be formed by the following method. A plate of propellant may be formed by any method known in the art, including but not limited to molding and machining. Next, a series of holes may be drilled into the plate corresponding to combustion chambers 212, and finally first igniters 214 may be inserted into combustion chambers 212 according to any method previously discussed or known in the art. Alternatively, combustion chambers 212 may be formed during the molding process of the plate using a series of properly space mandrels (not shown). The mandrels may or may not comprise first igniters 214, as previously discussed.

The combustion chambers 212 may be spaced apart by a separation Sc sufficient so that the walls separating adjacent combustion chambers 212 can withstand preferably the entire combustion chamber pressure, at least at the beginning of the burn. Therefore, should one engine 210 ignite and begin burning a short time before an adjacent engine 210 ignites and burns, the combustion chamber pressure in the one engine 210 will not immediately cause a breach of the wall into the adjacent engine 210. The pressure-withstanding capability of each combustion chamber will depend on the chemical composition of the walls, their structure, thickness, and so forth, and one of ordinary skill in the art will understand how to calculate or engineer the proper separation Sc to fulfill the above mentioned criteria. Further, the outermost combustion chambers 212 may be spaced apart from an outer edge of the stage 202 by a separation Se sufficient so that the outer walls can withstand preferably the entire combustion chamber pressure, for at least the beginning of the burn and preferably for the majority of the burn time. The burn time just refers to the time that most other interior engines 210 will burn before either: a) the walls between them breach as they are burned away; and/or b) the top portions of the combustion chambers breach.

FIG. 5 shows two connected stages 202, 204, connected via a second igniter 206, which may be in the form of a plate. Stages 202, 204 may be connected to the second igniter 206 by any means previously discussed or known in the art, including welding, dissolution, adhesive, mechanically (e.g., a mechanical clamp), etc. Second igniter 206, which may or may not comprise the same structure and composition as first igniter 214, is preferably a fast-burning oxidizer-included substance that is hard, strong, and sturdy and can support the weight of the stages above it. The second igniter 206 is configured so that, when at least one of the engines 210 in the lower stage 202 breaches through the top, the hot product gases ignite the second igniter 206. The second igniter 206, upon deflagration, causes hot product gas to ignite substantially every first igniter 214 in upper stage 204, causing substantially every engine 210 in upper stage 204 to burn and generate thrust. The second igniter 206, because it is fast-burning, will deflagrate at a rate such that substantially the entire second igniter 206 has burned in a small fraction (e.g., less than ⅓, or less than ⅕, or less than 1/10) of the engine burn time. Therefore, no matter where second igniter 206 is ignited (i.e., no matter which of the engines 210 in lower stage 202 breached), the second igniter 206 will deflagrate and ignite first igniters 214 in upper stage 204 at a rate fast enough that substantially all engines 210 in upper stage 204 are burning and generating thrust simultaneously for at least a majority of the burn time. Further, second igniter 206, upon deflagration, will cause stage separation of stage 202 from stage 204, because stages 202 and 204 are preferably connected only via second igniter 206. A second igniter 208 is also shown on top of upper stage 204, onto which another stage (not shown) may be added.

The dimensions $D_1$, $D_2$, and $D_3$ are preferably chosen such that stages 202, 204 have plate shapes. For example, width $D_2$ is at least 1.5 times, preferably at least 2 times, preferably at least 3 times, and preferably at least 5 times height $D_1$, and so forth. However, the "plate" shape may have a height $D_1$ that is greater than either or both of dimensions $D_2$ and $D_3$. The lower stage 202 may be ignited using another second igniter (not shown), well-timed parallel electrical squibs (as in FIG. 7), using a plurality of jets of hot gas (e.g., from a gas generator) aimed at the respective first igniters 214 of lower stage 202, and any other method of ignition known in the art.

In operation, substantially all engines 210 of lower stage 202 are preferably ignited at substantially the same time (or within a time period that is a small fraction of the burn time), and substantially all engines 210 burn and generate thrust simultaneously in parallel fashion, until at least one of the engines 210 breaches a top of its combustion chamber 212, so that the second igniter 206 ignites, causing stage separation and ignition of substantially all engines 210 in upper stage 204 within a time period that is a small fraction of the burn time, and the process repeats.

Figure 6:
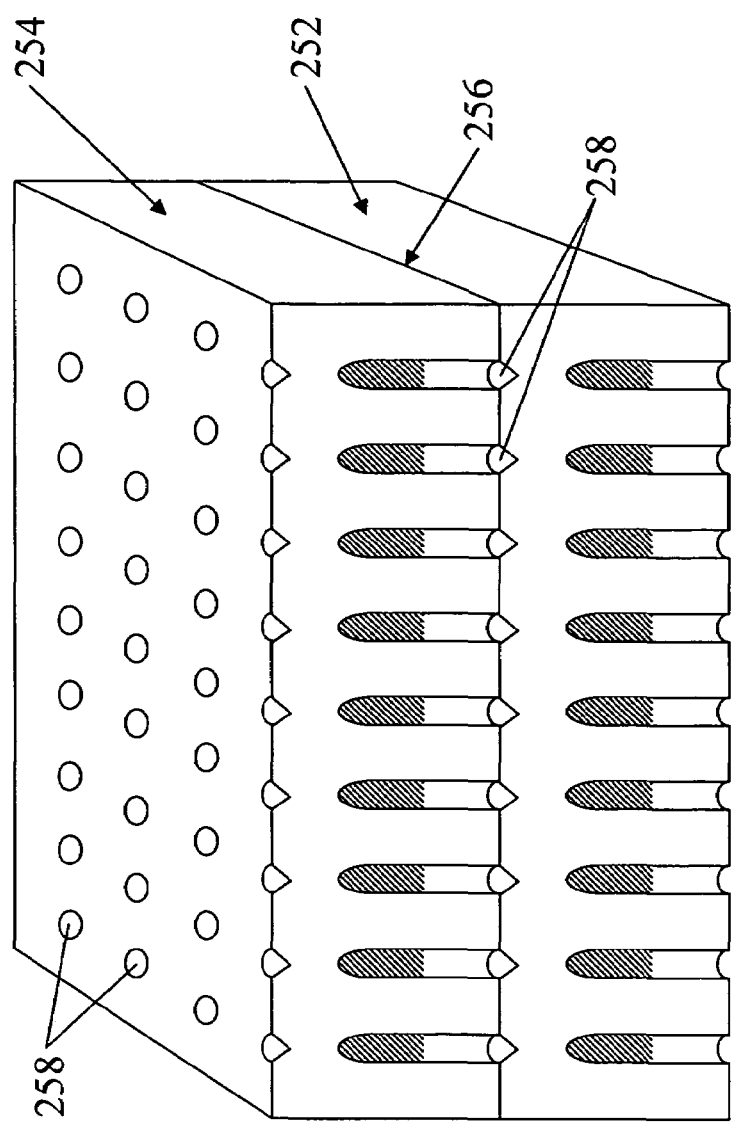
FIG. 6 shows a multi-engine stage according to another embodiment of the present invention.

Referring now to FIG. 6, a lower multi-engine rocket stage 252 is connected preferably directly to an upper multi-engine rocket stage 254. The stages 252, 254 may be integrally or adhesively connected, or connected by any other means known in the art, such as mechanically. Connection interface 256, if one exists, may be integral, such as where the two stages 252, 254 have been welded together with molten propellant or dissolved together using a volatile solvent, or may comprise an adhesive. Of course, stages 252, 254 may be formed in a continuous process, as discussed previously regarding continuously forming the multi-stage unit 2 in FIG. 1, in which case an interface 256 may not exist. Also shown in FIG. 6 are indentations 258, such that each engine breaches at a location of the indentation 258 at the end of its burn, to ignite an adjacent upper stage engine. Unlike the embodiment described with respect to FIG. 5, adjacent stages 252, 254 may not separate upon the breach of a single lower stage engine. In other words, in the embodiment shown in FIG. 6, some engines in a lower stage may be burning and generating thrust simultaneously and in parallel with engines in an upper stage. In the embodiment in FIG. 5, substantially all engines 210 in a given stage 202, 204 ignite within a very short time period of each other, so that the ignitions in a given stage 202, 204 depend on each other. Because the ignitions of engines in subsequent upper stages do not necessarily depend on each other, the distribution of ignition of engines in subsequent upper stages may be or appear randomly distributed. Other features of the embodiment of FIG. 6 may be similar to the features described with respect to the embodiment shown in FIG. 5.

Figure 7:
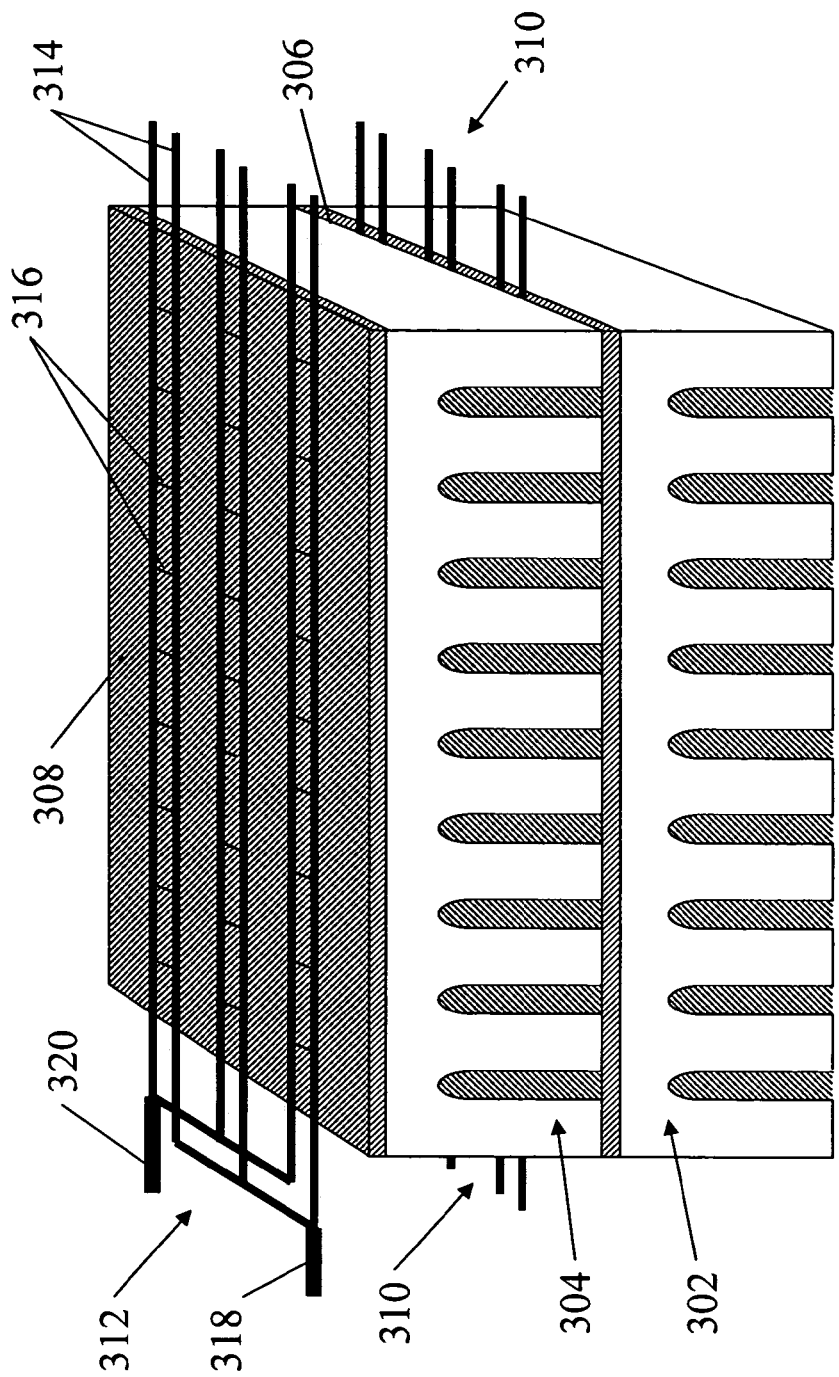
FIG. 7 shows a multi-engine stage according to another embodiment of the present invention.

Referring now to FIG. 7, a lower multi-engine solid propellant rocket stage 302 is connected to an upper multi-engine rocket stage 304 via a layer or plate 306. Stages 302, 304 may be similar to the stages 202, 204 described with respect to FIG. 5. Plate 306 is preferably heat retardant or resistant, such that spending of the lower stage 302 does not necessarily ignite the upper stage 304. Upper stage 304 and subsequent stages may be ignited by ignition layers 310, 312 that are preferably connected to and located above plates 306, 308 and may comprise electrical ignition squibs. For example, ignition layers 310, 312 may each comprise a series of low gauge (i.e., relatively thick so as to be able to carry a high electrical current) wires 314 that may be connected in parallel to common terminals 318 and 320. A series of high gauge wires 316 are connected to low gauge wires 314 in parallel so that application of a voltage across terminals 318, 320 will induce a current through substantially all high gauge wires 316. The high gauge wires 316 may be thin metal threads or filaments, so that a high current passing therethrough will cause a rapid increase in temperature due to electrical resistance, so that the filaments 316 either burn, or at least rise in temperature to a temperature above an ignition temperature of the first igniters located in each of the rocket engines.

In operation, the lower stage 302 is ignited (by any of the means previously discussed or known in the art), and the first stage 302 burns and provides thrust as substantially all of its component engines burn and provide thrust. At or near the end of the burn time (such as when one or more engines breaches), an ignition voltage is provided (e.g., from a sensor, computer system, and power supply, not shown) to terminals 318, 320 of ignition layer 310, thus igniting substantially all rocket engines in the upper layer 304 simultaneously (or at least within a very short time relative to the burn time), where the cycle repeats. The ignition of the engines in the upper layer 304 will cause a force against the plate 306 (and any remaining propellant in lower stage 302), causing stage separation. Again, stages 302 and 304 may be connected to plate 306 by any means discussed or known. Variations of the embodiment shown in FIG. 7 (as in every other figure) are within the scope of the present invention. For example, low-gauge wires 314 need not be connected in parallel to each other; each "row" of wires 314 may be separately connected to a respective power supply (not shown), and so forth.

Figure 8B:
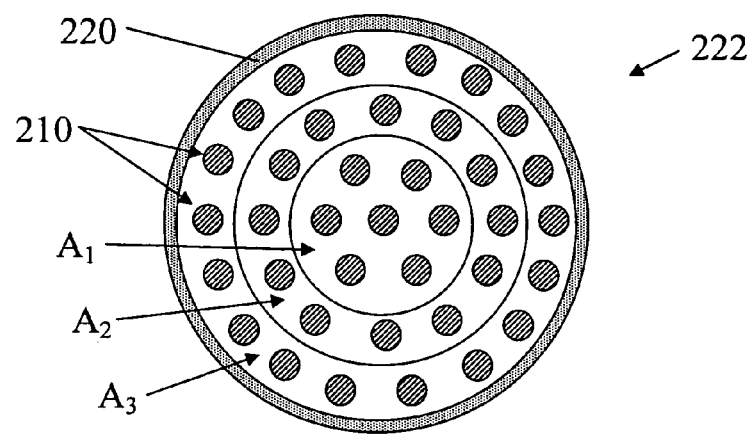

Referring now to FIG. 8b, the configuration shown is a variation of that shown in FIG. 8a. Of course, the multi-engine stage 202 in FIG. 8a may have any dimensions or shape desired. In FIG. 8b, a multi-engine stage 222 has an approximately circular cross section comprising annuluses $A_1$, $A_2$, and $A_3$. These annuluses, while shown for explanation in the drawing separated by circles, actually need not be separated at all. Each annulus includes a plurality of rocket engines 210 in parallel, and the stage 222 may include a layer 220 that may be a structure providing, pressure containing, or heat retardant/resistant layer.

If engines 210 are designed such as to maintain a substantially constant pressure (or any other configuration) such that the thrust varies with time (such as the case with simple cylindrical combustion chambers), it may not be beneficial to ignite all engines 210 simultaneously, because the total stage thrust may increase or decrease (depending on the configuration) with time. Thus, in one embodiment, the engines 210 are ignited inside-out, so that annulus $A_1$ is first ignited, and then a fraction (such as about ⅓) of the burn time later, annulus $A_2$ is ignited, and then a fraction (such as about ⅓) of the burn time later, annulus $A_3$ is ignited. The super-staged rocket (discussed later) may be configured such that the thrust from only the first two annuluses $A_1$ and $A_2$ is insufficient to lift the rocket, and only upon ignition of the third annulus $A_1$ is enough thrust generated to lift the rocket. By staggering ignitions in this or a similar way (such as outside-in), a large range of total thrust is avoided. Further, if the configuration shown in FIG. 8b is of the embodiment shown in FIG. 6, in which engines in each stage may ignite relatively independently of each other, the staggered ignition described herein will help to ensure a relatively constant (or at least not extremely varying) thrust during the total burn of the super-staged rocket because it will induce a more evenly (albeit randomly) distributed ignition and burn distribution of engines.

The embodiments shown in FIGS. 8a and 8b may be ignited as discussed, or in addition or alternatively, an igniter (not shown) may comprise a plurality of conduits connected in "parallel" so that each of the conduits has an exit that is aimed at the combustion chambers of one of the engines 210. The conduits may be connected to a common pyrotechnic or other hot gas source, so that generation of hot gas in the hot gas source causes hot gas to be exhausted from the exits of the conduits and up into the combustion chambers of the respective engines 210, thereby igniting the engines 210. The exits of the conduits may actually be located inside the combustion chambers, to ensure the hot gas thoroughly ignites most or all interior surfaces of the combustion chambers, or the exits may be located outside the combustion chambers, where the hot ejected gases have sufficient pressure and/or velocity to thoroughly heat most or all interior surfaces of the combustion chambers to ignition.

Figure 9:
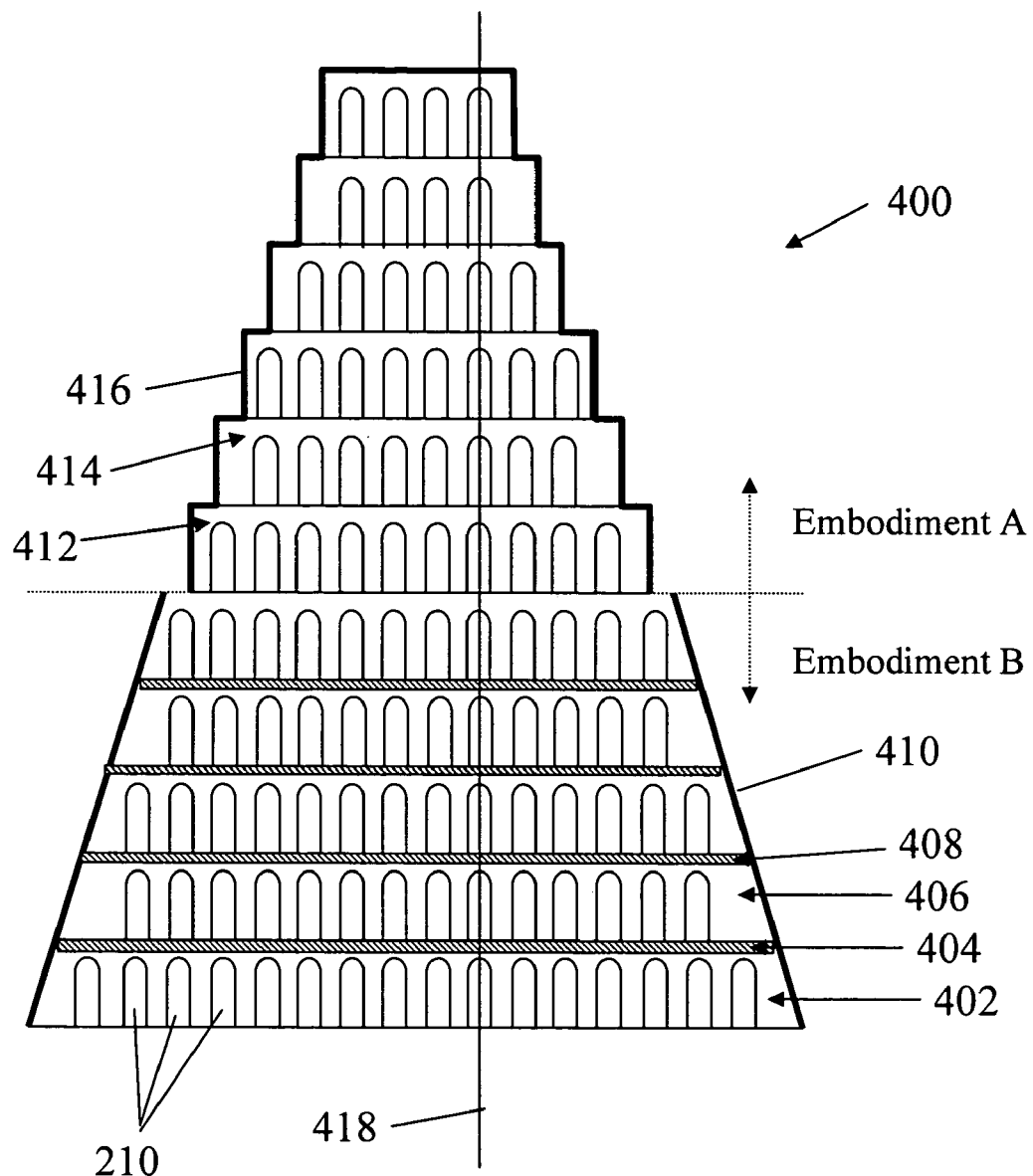
FIG. 9 shows a super-staged rocket according to an embodiment of the present invention.

Referring now to FIG. 9, two variations (Embodiments A and B) of a super-staged rocket 400 are shown. In Embodiment A, the super-staged rocket 400 comprises a plurality of multi-engine stages 412, 414, etc., that are stacked on top of each other and connected by any of the means discussed or known. The stages 412, 414 may have the configuration shown in FIG. 6, such that ignitions of engines in an upper stage 414 may be more or less randomly distributed. The stages 412, 414 may be separately fabricated and connected, or may be formed in a continuous process. The stages 412, 414, etc. may be enclosed by a layer 416, which may be structure providing, pressure containing, and/or heat retardant, and may define a staggered pyramidal outline, such that the weight and/or thrust-producing capability of each subsequent upper stage decreases.

In Embodiment B, the super-staged rocket 400 comprises a plurality of multi-engine stages 402, 406, etc., that are stacked on top of each other and connected by any of the means discussed or known. Preferably, a layer 404, 408, etc. is located between adjacent stages 402, 406, etc., and may comprise any of the layers previously discussed, such as a second igniter, a heat resistant plate, an electrical ignition layer, etc. The stages and plates 402, 404, 406, 408, etc. may be enclosed by a layer 410, which may be structure providing, pressure containing, and/or heat retardant, and may define a substantially smooth pyramidal outline, such that the weight and/or thrust-producing capability of each subsequent upper stage decreases. In one embodiment, corresponding engines 210 in adjacent stages are approximately vertically aligned, so that centers are approximately rectilinear, such as in the example shown with respect to vertical axis 418.

Figure 10:
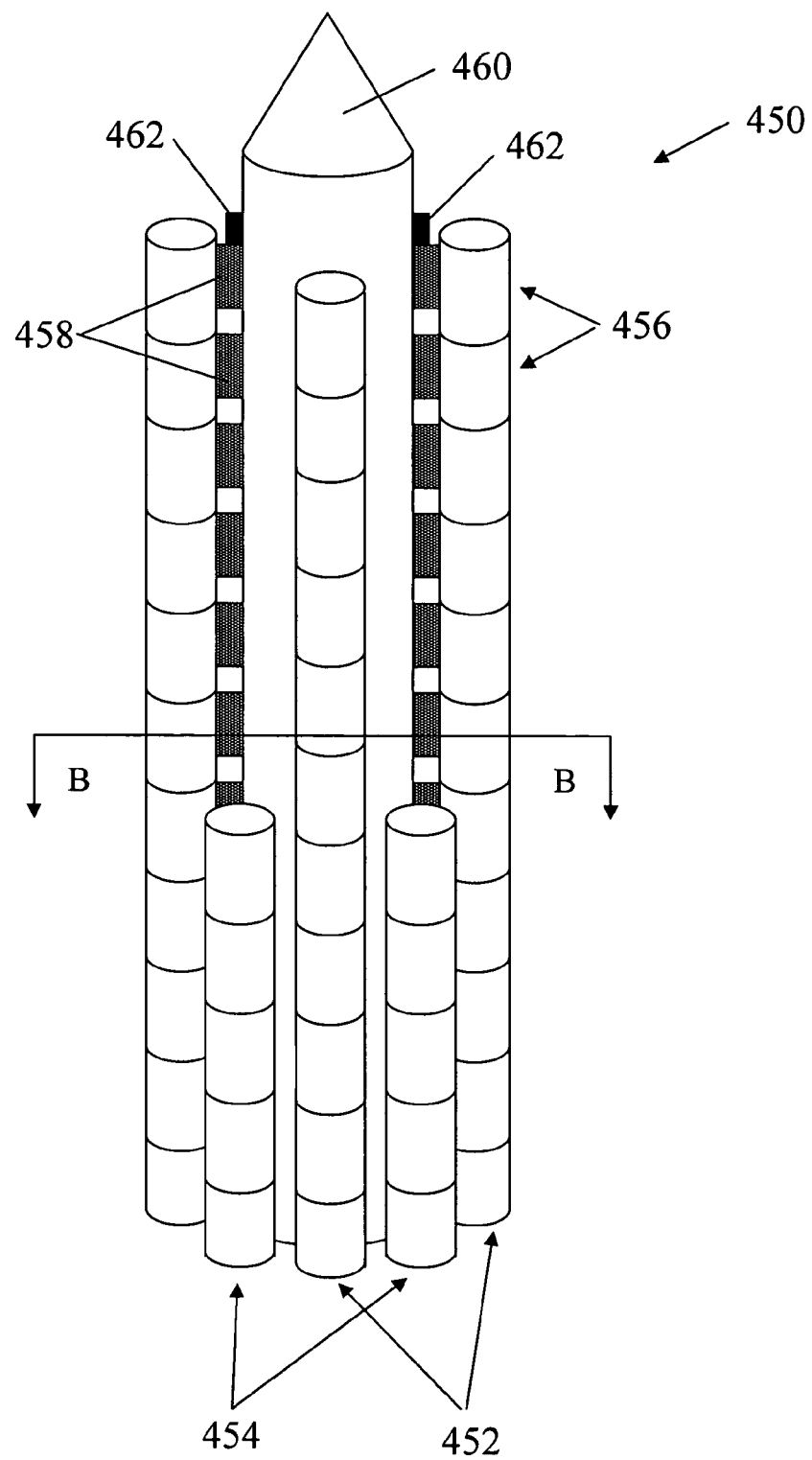
FIG. 10 shows a super-staged rocket according to another embodiment of the present invention.

Referring now to FIG. 10, well, frankly, FIG. 10 is my favorite. I'd just like to climb in the upper portion labeled 460 and blast off on a suborbital tour. A super-staged rocket 450 comprises a main region 460 connected to a plurality (such as at least three, preferably at least 5, more preferably at least 10, and more preferably at least 20) of multi-stage units 452, 454 that are connected in parallel. Multi-stage units 452, 454 may be any multi-stage unit, such as those described with respect to FIGS. 1–4, and each comprises a plurality (such as at least three, preferably at least 5, more preferably at least 10, and more preferably at least 20) of rocket engines 456 connected in series. Short multi-stage units 454 preferably comprise fewer rocket engines 456 than long multi-stage units 452, so that the first part of the rocket flight is provided with a higher thrust than the second (and subsequent) part of the flight. Further, super-staged rocket 450 may comprise more than two lengths of multi-stage units, such as at least three or at least five (not shown), so that the rocket's thrust at the beginning of the flight is greatest, and substantially incrementally decreases throughout the course of the flight.

Rocket engines 456 may be solid propellant rocket engines such as those previously described, or they may be small, cheap, mass producible hybrid or liquid propellant rocket engines. For example, a rocket engine 456 may comprise a high pressure tank filled with hydrogen peroxide (a monopropellant) and pressurized with an external pressurant, such as nitrogen or helium, or pressurized by decomposed hydrogen peroxide. The rocket engine 456 may further comprise a valve, such as a continuous valve but preferably a binary valve for simplicity, and a rocket engine comprising a combustion chamber, nozzle, and catalyst to catalytically break down the hydrogen peroxide. Such a rocket engine is very simple in design and may be mass produced cheaply. The valve may be connected to a sensor and controller and/or receiver such that the valve is opened either upon an external command (such as from a central computer located in main region 460) or upon an internal command based on a sensor that senses when an adjacent lower stage has been or is near to being spent. Upon opening of the valve, high pressure hydrogen peroxide flows through the catalyst, where it decomposes into hot, high-pressure oxygen and steam and expands through the nozzle to generate thrust. Any liquid propellant rocket engine is within the scope of the present invention, but the simpler and cheaper and more reliable, the better. Rocket engines 456 may also be a simple hybrid engine, such as one using hypergolic propellants, whereby no complicated ignition means is necessary. The liquid fuel or oxidizer may be fed to the combustion chamber, containing the other of the fuel and oxidizer, via a preferably binary valve, where the propellants react to form hot, high pressure gas that expands through the nozzle and generates thrust. Of course, the valve may be continuously operable, whereby the engine's thrust is variable according to a command, but this may add additional complexity.

In FIG. 10, the multi-stage units 452, 454 may be separated by a distance sufficient to prevent the explosion and/or breach and/or malfunction of an engine 456 in one multi-stage unit 452, 454 to affect or damage or cause a malfunction of an engine 456 in a different (e.g., adjacent) multi-stage unit 452, 454. Such a distance can be relatively easily calculated or engineered by one of ordinary skill in the art.

Figure 11:
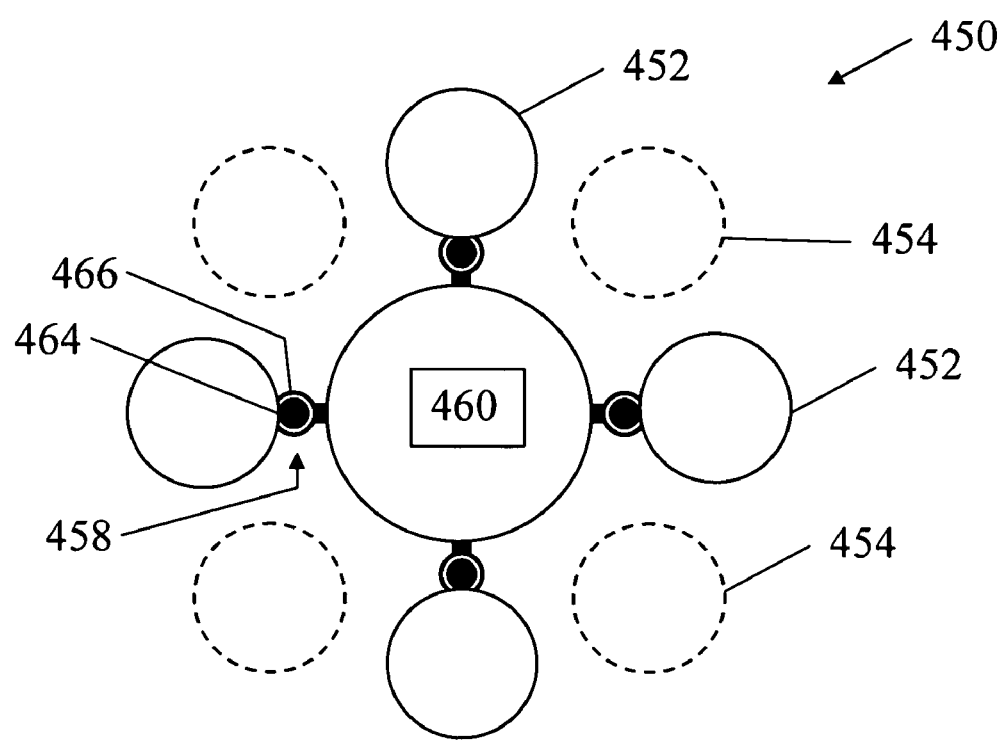
FIG. 11 shows a cross section of the embodiment shown in FIG. 10 through section B—B.

Referring now also to FIG. 11, main region 460 is a structure providing device and may be substantially empty, or may contain an additional propulsion means, such as a rocket engine and/or a multi-stage unit as described herein. Main region 460 is connected to multi-stage units 452, 454 via sliding connectors 458. Sliding connectors 458 each comprise a cylindrical portion 464 and an extruded annulus portion 466 that is configured to comfortably/smoothly but securely slide over the cylindrical portion 464. The sliding connectors 458 provide a secure, preferably relatively stiff connection between the main region 460 and multi-stage units 452, 454, while at the same time allowing a relative movement along an axis parallel to the axial center of the main region 460. The super-staged rocket 450 further comprises a top stop 462 (with a corresponding bottom stop, not shown) preferably for each multi-stage unit 452, 454 to prevent the prevent the multi-stage units 452, 454 from sliding upward above the main portion 460—i.e., the thrust provided by the multi-stage units 452, 454 is transferred to the main portion 460 via top stops 462. Stops 462 may correspond to and serve a similar purpose as top stops 164 shown in FIG. 4, and bottom stops (not shown) may correspond to and serve a similar purpose as bottom stops 162 shown in FIG. 4. Like bottom stops 162, the bottom stops of the embodiment in FIG. 10 may also decompose, burn, melt, mechanically drop off, etc., so that, after ignition and launch of super-staged rocket 450, individual rocket engines 456 may slide downward along sliding connectors 458 to drop off the super-staged rocket 450 after being spent.

Of course, sliding connectors 458 as shown in FIG. 11 are just one possible implementation of sliding connectors that allow relative motion between two objects in only a single direction. Such one-dimensional connectors are well known and will not be further described herein, but the scope of the present invention includes all such known connectors. Sliding connectors 458 may or may not also be openable and closeable, whereby the clamp-shaped extruded annulus portions 466 may mechanically open and close like a clamp (e.g., under the action of a controlled motor), so that multi-stage units 452, 454 may be connected to the main region 460 without the need for sliding the multi-stage units 452, 454 on.

In operation, the bottom "stage" of super-staged rocket 450—i.e., the engines 456 comprising the bottom-most engines 456 in each of the multi-stage units 452, 454—or at least some engines 456 in the bottom stage, are ignited, and sufficient thrust is generated to lift the rocket. The multi-stage units 452, 454 may be substantially independent of each other, so that ignition of a particular "stage" or engine in one unit may be substantially independent of ignitions of engines in other units. Due to manufacturing tolerances and errors, some engines 456 may burn faster than others, and some multi-stage units may, as a whole, burn faster than others. Thus, the ignition of engines 456 in each "stage" may be random. With a sufficiently large number of units 452, 454, these minor variations in ignition timing, burn rates, thrust levels, and so forth may substantially cancel each other out, so that the overall thrust of the vehicle is accurately predictable. Continuing the description of operation, as the bottom engines 456 are spent, adjacent upper engines are ignited, which provide thrust, and the process continues. Finally, all engines 456 in the short multi-stage units 454 are spent, and the remaining reduced thrust level is generated only by burning engines 454 in the long multi-stage units 452. In the case of some of the multi-stage solid propellant rocket units described herein, subsequent ignitions may be caused by breaches of adjacent lower rocket engines. Alternatively, subsequent ignitions may be intentionally caused and specifically timed by a central computer or controller (such as in main region 460), such as by providing a large current to leads 318, 320 in the embodiment shown in FIG. 7. As discussed above, subsequent ignitions may be provided for in a rocket 450 having liquid or hybrid rocket engines 456 by providing valve-opening signals and/or ignition signals (for those engines 456 that require hot ignition, such as a hybrid engine with non-hypergolic propellants) from a central computer or controller, for example.

Of course, as with the super-staged rocket described with respect to FIG. 9, the super-staged rocket 450 in FIG. 10 has advantages of high reliability due to redundancy, as well as low cost due to the ease of fabricating a large number of small, simple, inexpensive rocket engines and multi-stage units.

Figure 12:
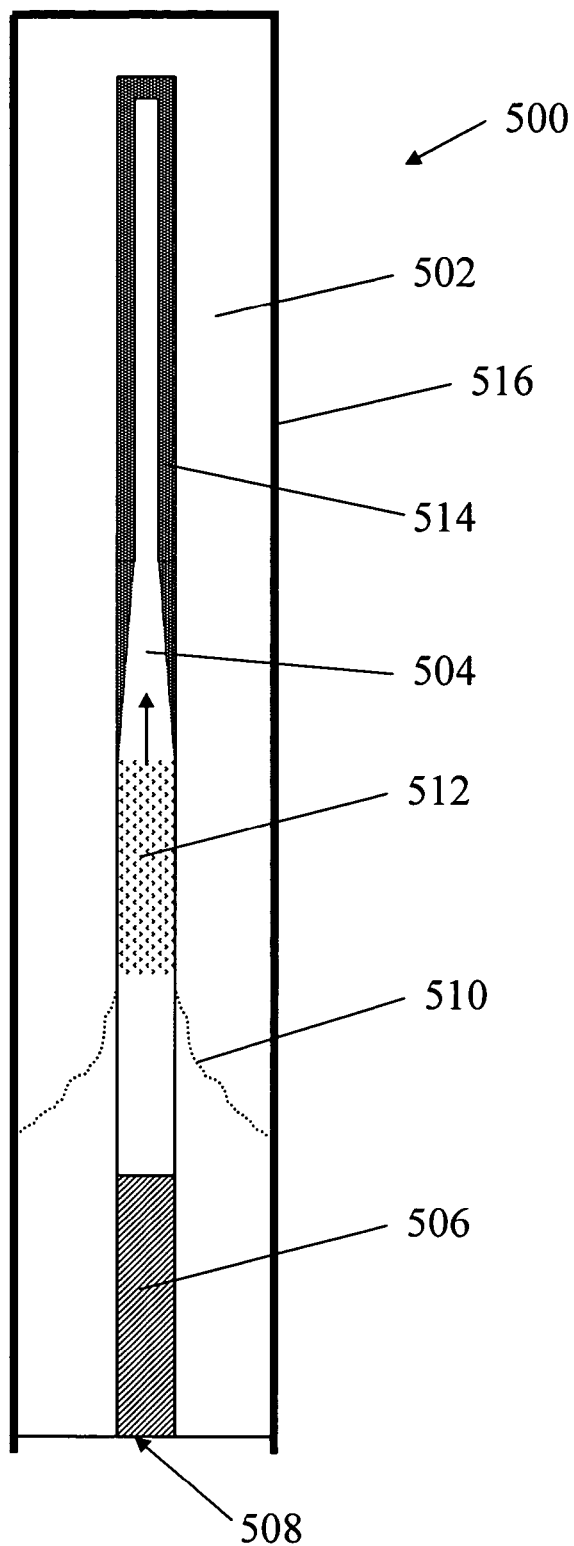
FIG. 12 shows a solid propellant rocket engine according to another embodiment of the present invention.

Referring now to FIG. 12, a variation on a multi-stage unit is shown. A continuously staged solid propellant rocket engine 500 comprises a very long propellant grain 502 having a long combustion chamber 504 and a nozzle 508. Initially, the combustion chamber 504 contains a first igniter 506. Also, the engine 500 includes a combustion inhibitor 514 coating the inner walls of the combustion chamber (except the region in which combustion should take place at the rocket's ignition, such as at or near the igniter 506), which may comprise a material any material that does not fully burn in the absence of air—i.e., it contains little or no oxidizer, or it contains little or no fuel. Combustion inhibitor 514 is configured to melt and/or vaporize upon exposure to the hot, high-pressure gases created in the combustion chamber due to deflagration of propellant 502. However, because combustion inhibitor 514 preferably adds little or no heat to the hot, high-pressure combustion gases, it slows the upward spreading of the combustion flame, so that only a relatively small portion of the total propellant grain 502 is burning at any given time. However, combustion inhibitor 514 should be configured (by material choice, quantity, density, etc.) to allow the combustion flame to propagate upward at a rate sufficient to ensure a high combustion chamber pressure and a sufficient thrust generation. Continuously staged engine 500 may include a layer 516 about the external surface of the propellant 502 that serves as at least one of a structure providing, a pressure containing, and a heat retarding layer, as previously discussed.

Initially, the engine 500 comprises an igniter 506 that is located at a top of a region of the combustion chamber 504 in which combustion should take place upon ignition, and may (but may not) span to the bottom of the engine 500, as shown. The propellant grain 502 and combustion chamber 504 may both be substantially cylindrical, but other configurations are of course within the scope of the present invention. Initially, the combustion inhibitor 514 preferably coats the entire upper internal surface of the combustion chamber 504, down to the top of the igniter 506, but may span further or fewer regions if desired.

In operation, the igniter 506 is ignited, causing ignition of the propellant walls of the combustion chamber 504, creating hot, high-pressure gases that expand and accelerate through and from nozzle 508 into the atmosphere, generating thrust. The existence of the combustion inhibitor 514 substantially prevents upward propagation of the combustion flame to upper combustion chamber surfaces. However, the hot, high-pressure gases slowly but steadily vaporize the combustion inhibitor 514, eventually exposing new combustion chamber wall surfaces, where the combustion flame propagates. Preferably, this action occurs at substantially the same rate that lower portions of the engine 500 are consumed by combustion, so that substantially the same quantity of combustion occurs as the flame propagates upward, or at least the thrust and/or pressure remain within an acceptable range.

Curve 510 indicates an example of the bottom propellant grain surface during the engine's burn. Notice that a combustion flame 512 remains approximately constant in size/length and moves upward as shown by the arrow, as it vaporizes adjacent portions of the combustion inhibitor 514 to expose and ignite new combustion chamber walls. Of course, the original "nozzle" 508 has fully deflagrated at this point, so that the effective nozzle (that region through which the hot, product gases expand into the atmosphere) moves upward with consumption of the propellant grain 502. The curve 510 may act as an expansion region to further accelerate the hot combustion gases to provide more thrust.

The engine 500 is called "continuously staged" because, in some sense, the engine 500 comprises a large quantity of tiny, perhaps indistinguishable stages that are each spent. Of course, "continuous staging" could also imply that, at any given time during a total burn of a super-staged rocket, at least one engine is burning and providing thrust, and/or the ignition of a large number of component rocket engines is randomly distributed.

Engine 500 may be formed by casting and/or machining propellant grain 502 into its desired shape, and then casting and/or machining a corresponding combustion inhibitor 514 to snugly fit inside the combustion chamber 504 of the propellant grain 502, and then adhesively connecting the combustion inhibitor 514 inside the combustion chamber 504. Then, layer 516 and igniter 506 are added by methods known or described herein. Of course, any other possible methods described herein may also be used.

Figure 13:
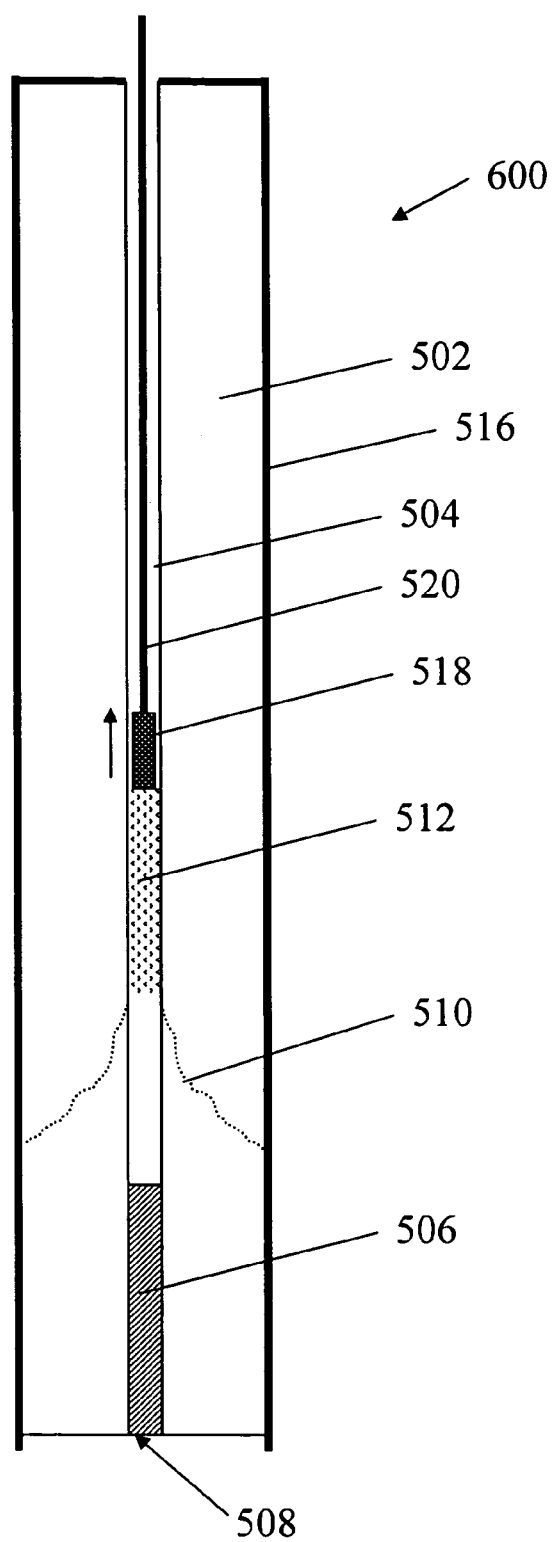
FIG. 13 shows a solid propellant rocket engine according to another embodiment of the present invention.

Referring now to FIG. 13, another continuously staged rocket engine 600 is similar and uses several of the same reference numbers as continuously staged rocket engine 500 shown in FIG. 12. Engine 600 differs in that, instead of using a combustion inhibitor 514 to regulate combustion within the combustion chamber 504, a mechanical combustion regulator 518 is moveably located in the combustion chamber 504 and is configured to withstand the high combustion chamber pressure. The regulator 518 preferably comprises a material (such as a metal, e.g., tungsten) that will not substantially vaporize or liquefy at combustion chamber temperatures, and/or comprises a material (e.g., plastic or a glass) that will liquefy or vaporize, but with a "sacrificial" thickness sufficient that the regulator 518 has a remaining thickness capable of withstanding the high combustion chamber pressure even until and preferably after the end of the rocket's burn. The regulator 518 is sized at or close to the dimension of the combustion chamber 504 so that little or no combustion gas escapes around the regulator 518 to ignite propellant 502 before desired. The regulator 518 is connected to a movable control rod 520 that may be moved automatically or controlled as desired, such as by an external controller, computer, motor, etc. (not shown).

The operation of the engine 600 is similar to that of the rocket 500 in FIG. 12, except that the position of the regulator 518 may be controlled as desired. The position of the regulator 518 largely determines the combustion chamber surface area available for combustion, and thus largely determines the combustion chamber pressure and resulting engine thrust. Thus, not only is engine 600 continuously staged, but it is also somewhat controllable and/or throttleable.

Other variations exist for controllably causing engines 500, 600 (FIGS. 12 and 13) to be continuously staged. For example, instead of inhibitor 514 or regulator 518, the engine may comprise a high-pressure gas source (not shown), preferably a non-reactive gas such as helium or nitrogen, located at and connected to the top of the engine, preferably via a valve. When the lower portion of the combustion chamber is ignited, the valve is opened, allowing gas from gas source to flow into the combustion chamber. If the pressure of the high-pressure gas is approximately matched to the combustion chamber pressure (or it may be slightly more or less, preferably less), then the ignition may very slowly move upward in the combustion chamber, inhibited by the coolness (and possible non-reactiveness) of the high-pressure gas from the gas source.

Figure 14:
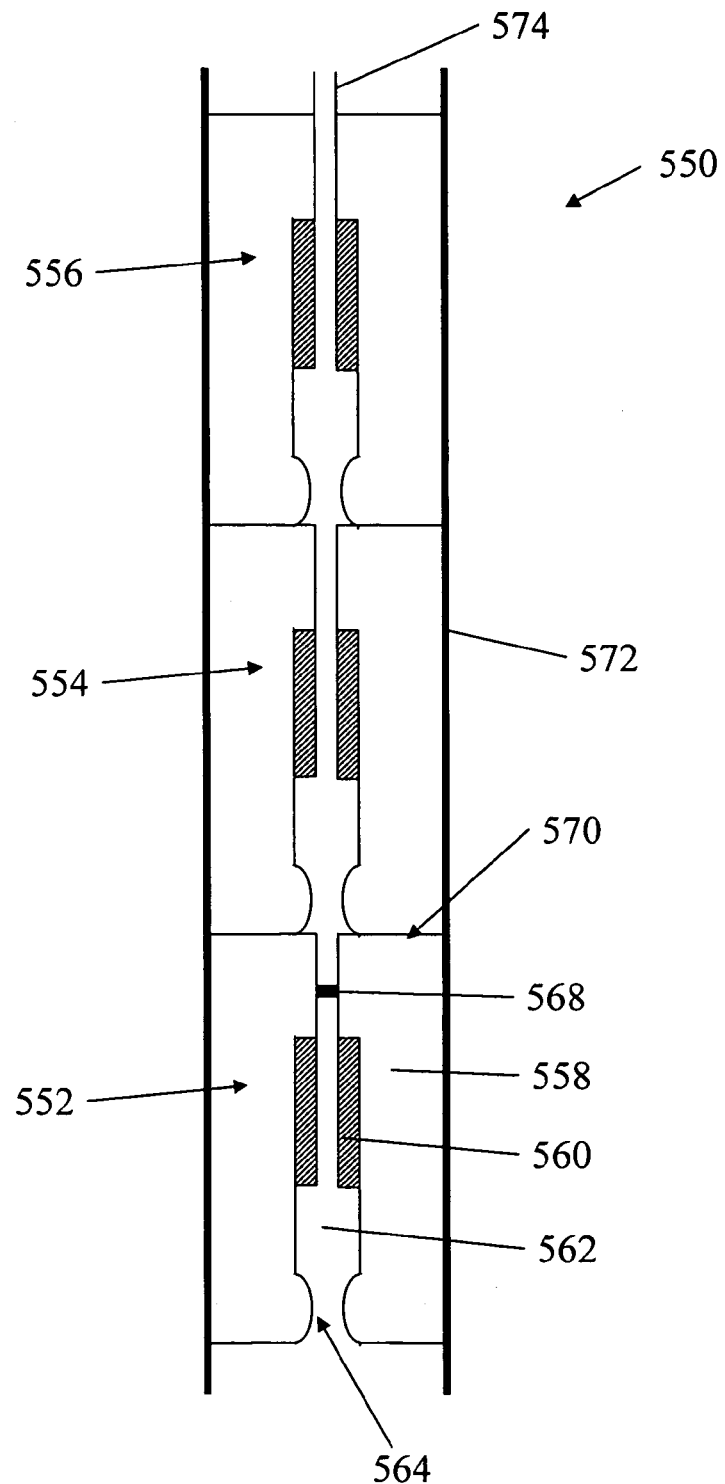
FIG. 14 shows a multi-stage hybrid rocket unit according to an embodiment of the present invention.

Referring now to FIG. 14, an example of a multi-stage hybrid rocket unit 550 comprises a plurality of hybrid rocket engines 552, 554, 556. Each engine comprises a solid propellant grain 558, such as a solid fuel or a solid oxidizer, a combustion chamber 562, a nozzle 564, and (in the case of non-hypergolic propellants) an igniter 560. The propellant grain 558 also includes a conduit portion, as shown, to allow the flow of the liquid propellant. Engines 552, 554, 556 are preferably connected at interfaces 570 either integrally or adhesively or by some other means known. In one embodiment, the engines are connected at interfaces 170 with sufficient strength to withstand the high pressure of the liquid propellant. In this embodiment, the unit 550 may comprise a structure-providing and/or heat retarding layer 572 that may or may not be pressure-containing. In another embodiment, the engines 552, 554, 556 may not be connected at all (or otherwise weakly connected) at interfaces 570, and may be connected only via connection to the layer 572. In this embodiment, layer 572 should be pressure-containing so as to withstand and contain the pressure of the high-pressure liquid propellant.

Multi-stage hybrid rocket unit 550 comprises a conduit 574 connected to the conduit of the top hybrid engine 556. The embodiment shown in FIG. 14 only shows three engines, but in a preferred embodiment the unit 500 comprises many more engines, such as at least 5 or at least 10. The bottom engine 552 comprises a valve 568 which may be a simple rupturable/breakable membrane, or may be a disposable binary valve.

In operation, conduit 574 is plumbed to a source of high-pressure liquid propellant that is reactive with propellant 558, although preferably only the vapor of the liquid propellant is plumbed to the conduit 574. Next, the igniter 560 of the bottom engine 552 is ignited, preferably causing membrane/valve 568 to melt/burn and rupture, allowing high-pressure vapor propellant to flow into the combustion chamber 562 of the bottom engine 552. The igniter 560 is configured to heat the combustion chamber walls to above an ignition temperature, after which the propellant 558 in the combustion chamber walls reacts with the vapor propellant flowing from conduit 574. The resulting hot, high-pressure product gases expands and accelerates through nozzle 564, causing thrust.

After the rocket has been substantially spent, an igniter fuse (not shown) travels from the lower engine 552 to an adjacent upper engine 554, thus igniting the igniter 560 of the upper engine 554. Because propellant vapor already exists in the combustion chamber of the upper stage 554, the hot gases of the deflagrated igniter 560 causes the vapor propellant and solid propellant 558 to react, and the cycle begins again. The unit 550 may be configured so that the lower stage 552 drops or breaks off upon ignition of the upper stage 554, or the lower stage 552 may simply continue to combust or vaporize or melt away as the upper stage burns 554, or any other possible configuration described herein or known in the art.

In the embodiments previously discussed, such as the multi-engine stages (e.g., 302 in FIG. 7) or the multi-stage units (e.g., 2 in FIG. 1), the individual rocket engines need not be perfect or reliable for the resulting super-staged rocket and/or stage and/or unit to function properly. The large number of engines provides a high degree of redundancy, such that even if one or a few (but preferably a small percentage of) engines fail (such as by failure to ignite, failure to reach the desired thrust or combustion pressure, explosion, etc.), the rocket and/or stage and/or unit as a whole is not a failure. This explains why the phrase "substantially all" has been used, e.g., when describing the ignition of substantially all engines in a stage, etc.

The above description has included lots of embodiments and variations, and for each embodiment various examples (such as examples of possible materials or configurations) have been given. In some descriptions, some examples were given that may have been unintentionally omitted from other corresponding descriptions. For example, it may have been stated that layer 20 in FIG. 1 may comprise paper or plastic, and it may have been stated that layer 70 in FIG. 2 may comprise paper. The omission of "plastic" from the second description would be unintentional. All features and examples given herein may, where physically possible, be applied to any embodiment described herein. For example, any regions of exposed propellant that should not burn (such as bottom 116, shown in FIG. 3) may have a heat retardant layer sprayed or applied thereon.

As a quick afterthought, a simple, easy-to-control solid propellant rocket engine may comprise a propellant grain of any known structure, and a nozzle having a variable throat or area. For example, the nozzle may comprise a spring and closing element (not shown) configured such that, as the pressure in the combustion chamber increases, the spring stretches to allow the closing element to open the nozzle further to increase the area through which hot product gas can flow. Such a configuration allows the pressure in the combustion chamber to decrease due to increased gas flow. The system is self-adjusting and the pressure can be reliably and safely controlled to a predetermined quantity or range. For example, the nozzle may comprise a single throat closed by the closing element (which is connected to the spring or similar element), so that the opening position of the closing element variably depends on the combustion chamber pressure, or the nozzle may comprise a plurality of smaller such nozzles, all aimed in substantially the same direction, where the closing elements on each of the nozzles are binarily or continuously openable, to allow for a substantially constant combustion chamber pressure. The closing element may move in a direction substantially parallel to the flow direction of the hot, high pressure product gases, or in a direction substantially perpendicular to the flow (e.g., where the throat is variable in a way similar to an eye iris or camera iris), or at an angle to the flow.

In addition or alternatively, where the variable nozzle discussed above serves as a negative feedback sensor and control system, a different negative feedback sensor and control system may be used, such as one that directly varies the combustion rate instead of indirectly varying the combustion rate by varying the nozzle/throat area. As an example but not a limitation, a source of high-pressure combustion inhibiting gas (e.g., helium or nitrogen or any gas that slows combustion) may be plumbed to the combustion chamber via a valve that is pneumatically connected to the combustion chamber. The valve should be configured such that as the pressure increases, the valve opens (preferably continuously) to allow the combustion inhibiting gas into the combustion chamber, thus slowing combustion and reducing the pressure.

I claim:

1. A super-staged rocket comprising at least approximately 50 rocket engines, each one of the engines comprising propellant having a predetermined shape and a nozzle formed as part of the predetermined shape, wherein said engines are distributed according to at least one of:
    a) at least five multi-engine stages connected in series, each stage comprising at least ten engines connected in parallel; and
    b) at least five multi-stage units connected in parallel, each unit comprising at least five engines connected in series.

2. The super-staged rocket as claimed in claim 1, wherein an ignition of a first rocket engine in a stage is substantially independent of an ignition of a second rocket engine in a same or corresponding stage.

3. The super-staged rocket as claimed in claim 1, wherein the super-staged rocket is configured so that, when a rocket engine in an upper stage is ignited by completion of a burn of a corresponding rocket engine in an adjacent lower stage, the upper and lower stages do not, as a whole, separate.

4. The super-staged rocket as claimed in claim 1, wherein the super-staged rocket is configured so that, when a rocket engine in an upper stage is ignited by completion of a burn of a corresponding rocket engine in an adjacent lower stage, the upper and lower stages separate.

5. The super-staged rocket as claimed in claim 1, wherein said rocket engines comprise solid propellant rocket engines.

6. The super-staged rocket as claimed in claim 1, wherein said rocket engines comprise at least one hybrid rocket engine.

7. The super-staged rocket as claimed in claim 1, wherein said engines are distributed as at least five multi-engine stages connected in series, each stage comprising at least ten engines connected in parallel.

8. The super-staged rocket as claimed in claim 1, wherein said engines are distributed as at least five multi-stage units connected in parallel, each unit comprising at least five engines connected in series.

9. A super-staged rocket, comprising:
    at least one of: a plurality of multi-engine stages, each multi-engine stage comprising a plurality of rocket engines; and a plurality of multi-stage units, each multi-stage unit comprising a plurality of rocket engines, whereby the super-staged rocket comprises a total number of rocket engines, wherein each one of the engines comprises propellant having a predetermined shape and a nozzle formed as part of the predetermined shape, wherein for each rocket engine of at least most of the total number of rocket engines, an ignition of said each rocket engine is caused by completion of a burn of a corresponding rocket engine of an adjacent lower stage, wherein a time of said ignition is randomly distributed with respect to ignitions of other rocket engines in a same or corresponding stage of said each rocket engine due to a random distribution of burn times of corresponding rocket engines in said adjacent lower stage or stages corresponding to said adjacent lower stage.

10. The super-staged rocket as claimed in claim 9, comprising said plurality of multi-engine stages, wherein for each rocket engine of at least most of the total number of rocket engines, an ignition of said each rocket engine is caused by completion of a burn of a corresponding rocket engine of an adjacent lower stage, wherein a time of said ignition is randomly distributed with respect to ignitions of other rocket engines in a same stage of said each rocket engine due to a random distribution of burn times of corresponding rocket engines in said adjacent lower stage.

11. The super-staged rocket as claimed in claim 10, wherein said super-staged rocket is continuously staged, whereby at substantially any time during a total burn of said plurality of multi-engine stages, at least one of said rocket engines is burning and providing thrust, and wherein said continuous staging is caused at least in part by a random distribution of ignitions of rocket engines in said each multi-engine stage.

12. The super-staged rocket as claimed in claim 9, wherein said super-staged rocket comprises at least approximately 100 rocket engines.

* * * * *